US012605756B2

(12) United States Patent
Conaway et al.

(10) Patent No.: US 12,605,756 B2
(45) Date of Patent: Apr. 21, 2026

(54) HOT BOX EXCHANGE CAPABILITY AND METHOD THEREOF

(71) Applicant: The Boeing Company, Chicago, IL (US)

(72) Inventors: Donald Lloyd Conaway, Gig Harbor, WA (US); Larry Dean Hefti, Auburn, WA (US); Craig Eric Knowles, Wishaw (GB); John Vincenzo Storr, Stepps (GB); Alexander Sancho Garcia, Glasgow (GB); Marco Bucconi, Paisley (GB); David James Falconer Fyvie, Clarkston (GB); Innes Ewan Edward Edridge, Scotstoun (GB); Diego Gonzalez, Renfrewshire (GB); Steven Pacifico, Coatbridge (GB)

(73) Assignee: THE BOEING COMPANY, Arlington, VA (US)

( * ) Notice: Subject to any disclaimer, the term of this patent is extended or adjusted under 35 U.S.C. 154(b) by 597 days.

(21) Appl. No.: 18/045,631

(22) Filed: Oct. 11, 2022

(65) Prior Publication Data

US 2024/0116098 A1 Apr. 11, 2024

(51) Int. Cl.
*B21D 37/16* (2006.01)
*B21D 22/02* (2006.01)
(Continued)

(52) U.S. Cl.
CPC ........... *B21D 37/16* (2013.01); *B21D 22/022* (2013.01); *B30B 15/064* (2013.01); *B30B 15/34* (2013.01)

(58) Field of Classification Search
CPC ... B30B 15/028; B30B 15/062; B30B 15/064; B30B 15/068; B30B 15/34; B21D 37/16; B21D 37/02; B21D 22/022
See application file for complete search history.

(56) References Cited

U.S. PATENT DOCUMENTS 11,072,011 B2 7/2021 Sanders et al.
11,253,898 B2 2/2022 Sanders et al.
(Continued)

FOREIGN PATENT DOCUMENTS

CN 104227880 A 12/2014
CN 108704991 A 10/2018
CN 210059457 U 2/2020

OTHER PUBLICATIONS

Extended European Search Report issued Mar. 18, 2024 in corresponding EP Application No. 23195516.2, 10 pages.

*Primary Examiner* — Jimmy T Nguyen
(74) *Attorney, Agent, or Firm* — MH2 Technology Law Group LLP

(57) ABSTRACT

A removable hot box is disclosed that includes a lower hot box portion, including: a lower housing including a plurality of lower clamping structures to clamp the lower housing to a press and locating structures to provide repeatable placing in the press; and a lower heating platen, received within the lower housing, wherein the lower housing or the lower heating platen includes lower electrical connectors to provide a lower electrical connection to a heating system and lower cooling connectors to provide a lower cooling connection to a cooling system; and an upper hot box portion, positionable above the lower hot box portion and includes: an upper housing includes a plurality of upper clamping structures to clamp the upper housing to the press; an upper heating platen, received within the upper housing.

20 Claims, 21 Drawing Sheets

(51) Int. Cl.
*B30B 15/06* (2006.01)
*B30B 15/34* (2006.01)

(56) References Cited

U.S. PATENT DOCUMENTS

| | | | | |
|---|---|---|---|---|
| 2010/0166903 | A1* | 7/2010 | Krajewski | B21D 37/16<br>29/428 |
| 2014/0366356 | A1 | 12/2014 | Spary | |
| 2016/0193645 | A1* | 7/2016 | Sanders | C04B 35/66<br>501/94 |
| 2018/0117654 | A1* | 5/2018 | Hubbes | B30B 1/10 |
| 2020/0122216 | A1 | 4/2020 | Sanders et al. | |

* cited by examiner

HOT BOX EXCHANGE CAPABILITY AND METHOD THEREOF

FIELD

This application is directed to hot boxes for a press, and in particular, to interchangeable and removable hot boxes for press and methods of use thereof.

BACKGROUND

Conventional presses, such as hot-forming presses are expensive. For example, in the aerospace industry, a hot-forming press, capable of processing large parts, may cost in excess of US$2.5 million and even as much as US$10 million. Moreover, conventional hot-forming presses require expensive maintenance and are subject to unpredictable down-time, which adversely effects manufacturing cycle time. In addition, if a hot-forming press fails in operation, expensive rework of parts, being processed by the press at the time of failure, is often needed. As a worst-case scenario, such parts must be scrapped, resulting in significant additional costs.

SUMMARY

According to examples of the present disclosure, a removable hot box that is removable from a press is disclosed. The removable hot box comprises a lower hot box portion, comprising: a lower housing comprising a plurality of lower clamping structures to clamp the lower housing to the press and one or more locating structures to provide repeatable placing in the press; and a lower heating platen, received within the lower housing and configured to support a lower die, wherein the lower housing or the lower heating platen comprises one or more lower electrical connectors to provide a lower electrical connection to a heating system and one or more lower cooling connectors to provide a lower cooling connection to a cooling system; and an upper hot box portion, positionable above the lower hot box portion and comprising: an upper housing comprising a plurality of upper clamping structures to clamp the upper housing to the press; an upper heating platen, received within the upper housing and configured to support an upper die, wherein the upper housing or the upper heating platen comprises one or more upper electrical connectors to provide an upper electrical connection to the heating system and one or more upper cooling connectors to provide an upper cooling connection to the cooling system.

Various additional features can be included in the removable hot box including one or more of the following features. The removable hot box further comprises an upper internal frame and a lower internal frame to provide support to the hot box when not in the press, wherein the upper interface frame is connected to the upper housing and the lower internal frame is connected to the lower housing. The removable hot box further comprises one or more frame pins that connect the upper internal frame and the lower internal frame to yield a connected internal frame assembly. The lower internal frame and the upper internal frame provides for storing lower hot box portion and the upper hot box portion outside of the press. The lower internal frame provides for raising the lower hot box portion from a die cart or shuttle. The plurality of lower clamping structures and the plurality of upper clamping structures provide for hydraulic clamping to the lower hot box portion and the upper hot box portion to the press. The lower hot box portion further comprises a lower insulation layer that is positioned between the lower housing and the lower heating platen and the upper hot box portion further comprises an upper insulation layer that is positioned between the upper housing and the upper heating platen. The lower housing comprises a lower base plate and lower side walls, positioned above the lower base plate; the lower heating platen defines a lower slot, configured to receive a lower coupler for operatively retaining the lower die to the lower heating platen; and the lower side walls define a lower access passage, configured to provide access to the lower slot for operative insertion and removal of the lower coupler. The lower base plate, the lower insulation layer, and the lower heating platen collectively define at least one lower lift-pin passage, configured to receive at least one lower-die lift pin for operative engagement with the lower die and separation of the lower die from the lower hot box portion. The lower base plate, the lower insulation layer, and the lower heating platen collectively define lower bolt passages; and the lower hot box portion further comprises: lower bolts, extending through the lower bolt passages; and spring-loaded lower nut assemblies, operatively coupled to the lower bolts and configured to permit the lower hot box portion to expand and contract without damage to the lower hot box portion. The upper hot box portion comprises an upper base plate, wherein the upper base plate, the upper insulation layer, and the upper heating platen collectively define upper bolt passages; and the upper hot box portion further comprises: upper bolts, extending through the upper bolt passages; and spring-loaded lower nut assemblies, operatively coupled to the upper bolts and configured to permit the upper hot box portion to expand and contract without damage to the upper hot box portion. The one or more lower cooling connectors and the one or more upper cooling connectors provide a no-spill quick connection and disconnection to the cooling system. The removable hot box further comprises a seal position between the lower hot box portion and the upper hot box portion to provide a secure connection between the lower hot box portion and the upper hot box portion.

According to examples of the present disclosure, a method for operating a press with an interchangeable first hot box and an interchangeable second hot box is disclosed. The method comprises preparing a first hot box for operation by heating the first hot box to a first operating temperature by an off-line heating system; disconnecting the first hot box from the off-line heating system; disconnecting the second hot box from the press; replacing the second hot box with the first hot box in the press; connecting the first hot box to the press; and operating the press with the first hot box.

Various additional features can be included in the method including one or more of the following features. The connecting further comprises connecting one or more electrical connectors of the first hot box to the press. The connecting further comprises connecting one or more cooling system connectors of the first hot box to the press. The replacing further comprises moving the second hot box from the press to an off-line cooling system using a shuttle. The method further comprise moving the first hot box from the off-line heating system to the press using a shuttle. The first operating temperature comprises a temperature range from about 800° F. to about 2000° F. for forming a part made from aluminum, titanium, stainless steel, or oxidation-corrosion-resistant materials such as austenitic nickel-chromium-based superalloys. The method further comprises connecting one or more lower cooling connectors and one or more upper cooling connectors to a cooling system to provide a no-spill quick connection and disconnection to the cooling system.

The following is a non-exhaustive list of examples, which may or may not be claimed, of the subject matter according to the invention.

One example of the subject matter, according to the invention, relates to a press. The press comprises a lower press assembly and an upper press assembly. The lower press assembly is movable along a vertical axis and comprises a lower die, and a lower hot box portion, configured to receive the lower die. The upper press assembly is movable along the vertical axis above the lower press assembly and comprises an upper die, and an upper hot box portion. The upper hot box portion is configured to receive the upper die so that the upper die is positioned opposite the lower die. The lower die and the upper die are configured to apply a forming pressure to a workpiece that is received between the lower die and the upper die. The lower hot box portion and the upper hot box portion are configured to heat the workpiece.

By having both the lower press assembly and the upper press assembly movable along a vertical axis, the component(s) of the press that apply a forming force to generate the forming pressure (i.e., the tonnage of the press) for application to the workpiece need not have a significant stroke length that accounts both for operative placement of the workpiece and removal of a formed part from the press and for application of the forming force. Similarly, the component(s) of the press that apply a forming force to generate the forming pressure need not have a stroke length that also accounts for removal and replacement of the lower die and the upper die. Accordingly, the component(s) of the press that apply the forming force to generate the forming pressure undergo less stress over the same number of cycles than prior art presses, thus requiring less maintenance and repair over the lifetime of the press.

Another example of the subject matter, according to the invention, relates to a hot box of a press. The hot box comprises a lower hot box portion and an upper hot box portion. The lower hot box portion comprises a lower housing, a lower heating platen, and a lower insulation layer. The lower heating platen is received within the lower housing and is configured to support a lower die. The lower insulation layer is positioned between the lower housing and the lower heating platen. The upper hot box portion is positionable above the lower hot box portion and comprises an upper housing, an upper heating platen, and an upper insulation layer. The upper heating platen is received within the upper housing and is configured to support an upper die. The upper insulation layer is positioned between the upper housing and the upper heating platen. The lower hot box portion and the upper hot box portion provide a thermal barrier around a workpiece that is received between the lower die and the upper die, when the lower hot box portion and the upper hot box portion are in contact with each other.

The hot box provides a thermal barrier to maintain the heat delivered to the lower die and the upper die, and thus to the workpiece, when the press is operatively forming a part from the workpiece. The lower housing provides structure for supporting the other components of the lower hot box portion. The lower insulation layer insulates the lower heating platen, which is configured to support the lower die and conduct heat thereto, and thereby facilitates efficient heating of the lower die by restricting conduction away from the lower die. Similarly, the upper housing provides structure for supporting the other components of the upper hot box portion. The upper insulation layer insulates the upper heating platen, which is configured to support the upper die and conduct heat thereto, and thereby facilitates efficient heating of the upper die by restricting conduction away from the upper die.

Yet another example of the subject matter, according to the invention, relates to a method of forming a workpiece. The method comprises a step of vertically moving both a lower press assembly and an upper press assembly to a loading configuration, in which the lower press assembly and the upper press assembly are spaced-apart to receive the workpiece. The method comprises a step of positioning the workpiece between a lower die of the lower press assembly and an upper die of the upper press assembly. The method further comprises a step of vertically moving both the lower press assembly and the upper press assembly to a closed configuration, in which the lower press assembly and the upper press assembly are positioned to apply a forming pressure to the workpiece. The method also comprises a step of immobilizing the upper press assembly. The method further comprises a step of moving the lower press assembly toward the upper press assembly to apply the forming pressure to the workpiece. The method also comprises a step of heating the workpiece.

By vertically moving both the lower press assembly and the upper press assembly between the loading configuration and the closed configuration, the component(s) of the press that apply a forming force to generate the forming pressure (i.e., the tonnage of the press) for application to the workpiece need not have a significant stroke length that accounts both for operative placement of the workpiece and removal of a formed part from the press and for application of the forming force. Similarly, the component(s) of the press that apply a forming force to generate the forming pressure need not have a stroke length that also accounts for removal and replacement of the lower die and the upper die. Accordingly, the component(s) of the press that apply the forming force to generate the forming pressure undergo less stress over the same number of cycles than prior art presses, thus requiring less maintenance and repair over the lifetime of the press.

By immobilizing the upper press assembly, the component(s) associated with vertically moving the upper press assembly need not be capable of applying a forming force that is sufficient to generate the required forming pressure to operatively deform the workpiece. Rather, only the component(s) associated with vertically moving the lower press assembly need be capable of applying a forming force that is sufficient to generate the required forming pressure to operatively deform the workpiece. As a result, the component(s) associated with vertically moving the upper press assembly may be significantly less expensive than the component(s) associated with vertically moving the lower press assembly.

Yet another example of the subject matter, according to the invention, relates to a method of forming a workpiece. The method comprises a step of delivering an actively determined amount of heat to distinct lower regions of a lower heating platen of a lower hot box portion of a hot box of a press or to distinct upper regions of an upper heating platen of an upper hot box portion of the hot box.

By vertically moving both the lower press assembly and the upper press assembly between the loading configuration and the closed configuration, the component(s) of the press that apply a forming force to generate the forming pressure (i.e., the tonnage of the press) for application to the workpiece need not have a significant stroke length that accounts both for operative placement of the workpiece and removal of a formed part from the press and for application of the forming force. Similarly, the component(s) of the press that apply a forming force to generate the forming pressure need not have a stroke length that also accounts for removal and replacement of the lower die and the upper die. Accordingly, the component(s) of the press that apply the forming force to generate the forming pressure undergo less stress over the same number of cycles than prior art presses, thus requiring less maintenance and repair over the lifetime of the press.

By immobilizing the upper press assembly, the component(s) associated with vertically moving the upper press assembly need not be capable of applying a forming force that is sufficient to generate the required forming pressure to operatively deform the workpiece. Rather, only the component(s) associated with vertically moving the lower press assembly need be capable of applying a forming force that is sufficient to generate the required forming pressure to operatively deform the workpiece. As a result, the component(s) associated with vertically moving the upper press assembly may be significantly less expensive than the component(s) associated with vertically moving the lower press assembly.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
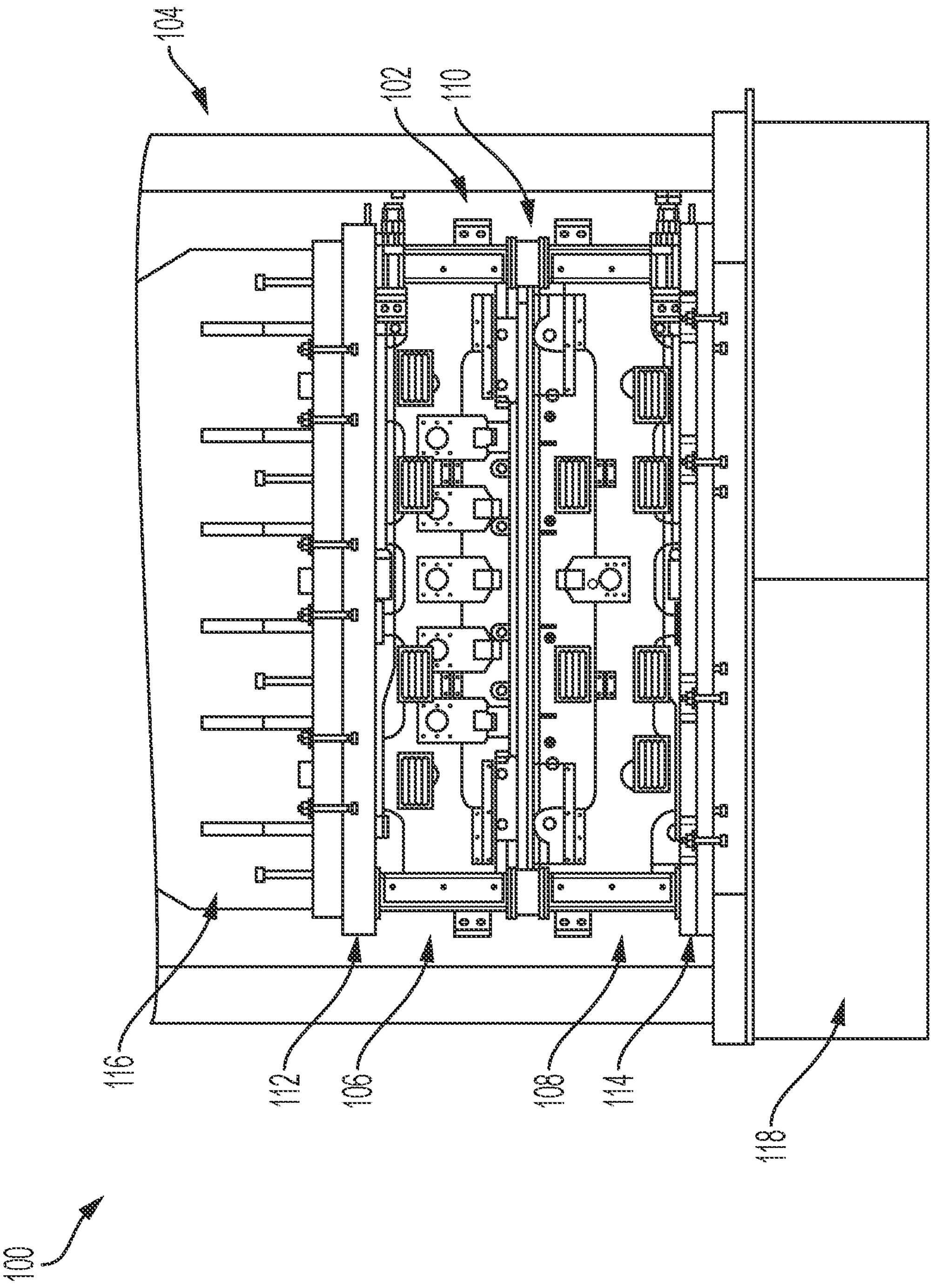
FIG. 1 shows a front view of a removable hot box that is removable from a press according to examples of the present disclosure.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according to the present disclosure are provided below.

FIG. 1 shows front view 100 of removable hot box 102 that is removable from press 104 according to examples of the present disclosure. Hot box 102 can also be termed "hot-box" or "hotbox" depending on the particular usage in the industry. Removable hot box 102 comprises lower hot box portion 106 and upper hot box portion 108. Lower hot box portion 106 and upper hot box portion 108 are joined and securely connected together by flexible heat seal 110. Upper base plate 112, sometimes called an upper strongback or just strongback, is arranged on a top surface of upper hot box portion 106 and lower base plate 114, sometimes called a lower strongback or just strongback, is arranged on a bottom surface of lower hot box portion 108. Upper base plate 112 and lower base plate 114 provide structural reinforcement to hot box 102 and can be composed of materials, including but are not limited to, oxidation-corrosion-resistant materials such as austenitic nickel-chromium-based superalloys. Other suitable materials can be used as is known in the industry.

Press 104 comprises lower press assembly 118 and upper press assembly 116. For example, press 104 can be a superplastic forming (SPF) press or a hot-forming press. Other types of presses that perform the functions described herein can also be used. Lower press assembly 118 and/or upper press assembly 116 can be movable along a vertical axis. Hot box 102 is received between lower press assembly 118 and upper press assembly 116. Upper hot box portion 106 is configured to receive an upper die and lower hot box portion 108 is configured to receive a lower die so that the upper die is positioned opposite the lower die. The lower die and the upper die are configured to apply a forming pressure to a workpiece that is received between the lower die and the upper die. Lower hot box portion 108 and upper hot box portion 106 are configured to form the workpiece.

By having both lower press assembly 118 and upper press assembly 116 movable along a vertical axis, the component(s) of press 104 that apply a forming force to generate the forming pressure (i.e., the tonnage of press 104) for application to the workpiece need not have a significant stroke length that accounts both for operative placement of the workpiece and removal of a formed part from press 104 and for application of the forming force. Similarly, the component(s) of press 104 that apply a forming force to generate the forming pressure need not have a stroke length that also accounts for removal and replacement of the lower die and the upper die. Accordingly, the component(s) of press 104 that apply the forming force to generate the forming pressure undergo less stress over the same number of cycles than prior art presses, thus requiring less maintenance and repair over the lifetime of press 104. In some examples, hot box 102 can be used in a conventional press, a conventional hot-forming press, or a conventional superplastic forming press where a lower press assembly is fixed and the upper press assembly is moveable.

In some examples, lower hot box portion 108 and upper hot box portion 106 are structures that not only support the lower die and the upper die, respectively, but also may be used to heat the lower die and the upper die for operative forming of the workpiece.

Referring generally to FIG. 1, lower hot box portion 104 and upper hot box portion 110 are configured to heat the workpiece to a temperature of at least 250° C., at least 500° C., or at least 750° C., or to a temperature in the range of 250-1000° C.

Heating the workpiece to a desired temperature enables an operator of press 104 to control the yield strength, hardness, and ductility of the workpiece, and ultimately of a part being formed from the workpiece. That is, depending on the material selection for the workpiece, a temperature or temperature range may be selected, for example, above the recrystallization temperature of the material to avoid string hardening of the material during the forming process. Moreover, heating the workpiece allows for high-strength materials to be formed at lower forming pressures than would be required in a cold-forming process.

Illustrative, non-exclusive examples of materials that may be used for the workpiece include (but are not limited to) various aluminum and titanium alloys and steels.

Referring generally to FIG. 1, the forming pressure results from a forming force of at least 50 metric tons, at least 100 metric tons, at least 300 metric tons, at least 500 metric tons, at least 700 metric tons, at least 1000 metric tons, or at least 2000 metric tons, or in the range of 50-2250 metric tons. Forming pressures are selected based on material properties of the workpiece and the complexity of a part being formed from the workpiece. Moreover, higher forming pressures may provide for lower temperature requirements to result in desired material properties of the part being formed from the workpiece.

Referring generally to FIG. 1, lower press assembly 118 and upper press assembly 116 are configured to be vertically moved to a loading configuration, in which lower press assembly 118 and upper press assembly 116 are spaced-apart to receive hot box 102. Lower press assembly 118 and upper press assembly 116 are configured to be vertically moved to a closed configuration, in which lower press assembly 118 and upper press assembly 116 are positioned to apply the forming pressure to hot box 102, and thus to the workpiece between upper hot box portion 106 and lower hot box portion 108. The loading configuration provides sufficient space for an operator or robotic arm to operatively place hot box 102 between lower press assembly 118 and upper press assembly 116. The closed configuration positions lower press assembly 118 and upper press assembly 116 for application of the forming pressure to the workpiece.

In some examples, the loading configuration also provides sufficient space for an operator or robotic arm to remove hot box 102 from lower press assembly 118 and upper press assembly 116 after press 104 has formed the part. Accordingly, in some examples, the loading configuration also may be referred to as an unloading configuration. Upper press assembly 116 is configured to be selectively locked in the closed configuration.

In some examples, by locking upper press assembly 116 in the closed configuration, the forming force required to generate the forming pressure to the workpiece need only be applied by lower press assembly 118. Accordingly, the component(s) of press 104 that vertically move upper press assembly 116 need not be capable of applying such high forces as may be required to generate a desired forming pressure, but rather need only be capable of moving upper press assembly 116 between at least the loading configuration and the closed configuration. Press 104 can further comprises an upper press head, at least one locking rod, and at least one rod clamp. Upper press assembly 116 is vertically movable relative to the upper press head. At least one locking rod is fixed to upper press assembly 116. At least one rod clamp is fixed to the upper press head and is configured to selectively clamp at least one locking rod to immobilize upper press assembly 116 relative to the upper press head. When at least one locking rod is clamped by at least one rod clamp, upper press assembly 116 is immobilized relative to the upper press head. Accordingly, when lower press assembly 118 applies the forming force to generate the forming pressure, upper press assembly 116 inherently applies an equal and opposite forming force for generation of the forming pressure that is applied to the workpiece for deformation thereof.

Figure 2B:
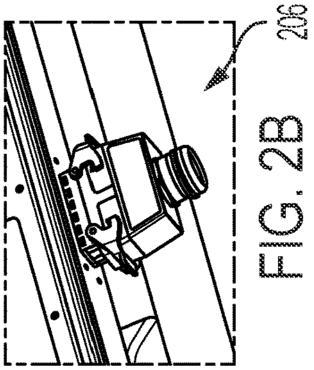
FIG. 2B shows a close-up view of FIG. 2A.
Figure 2A:
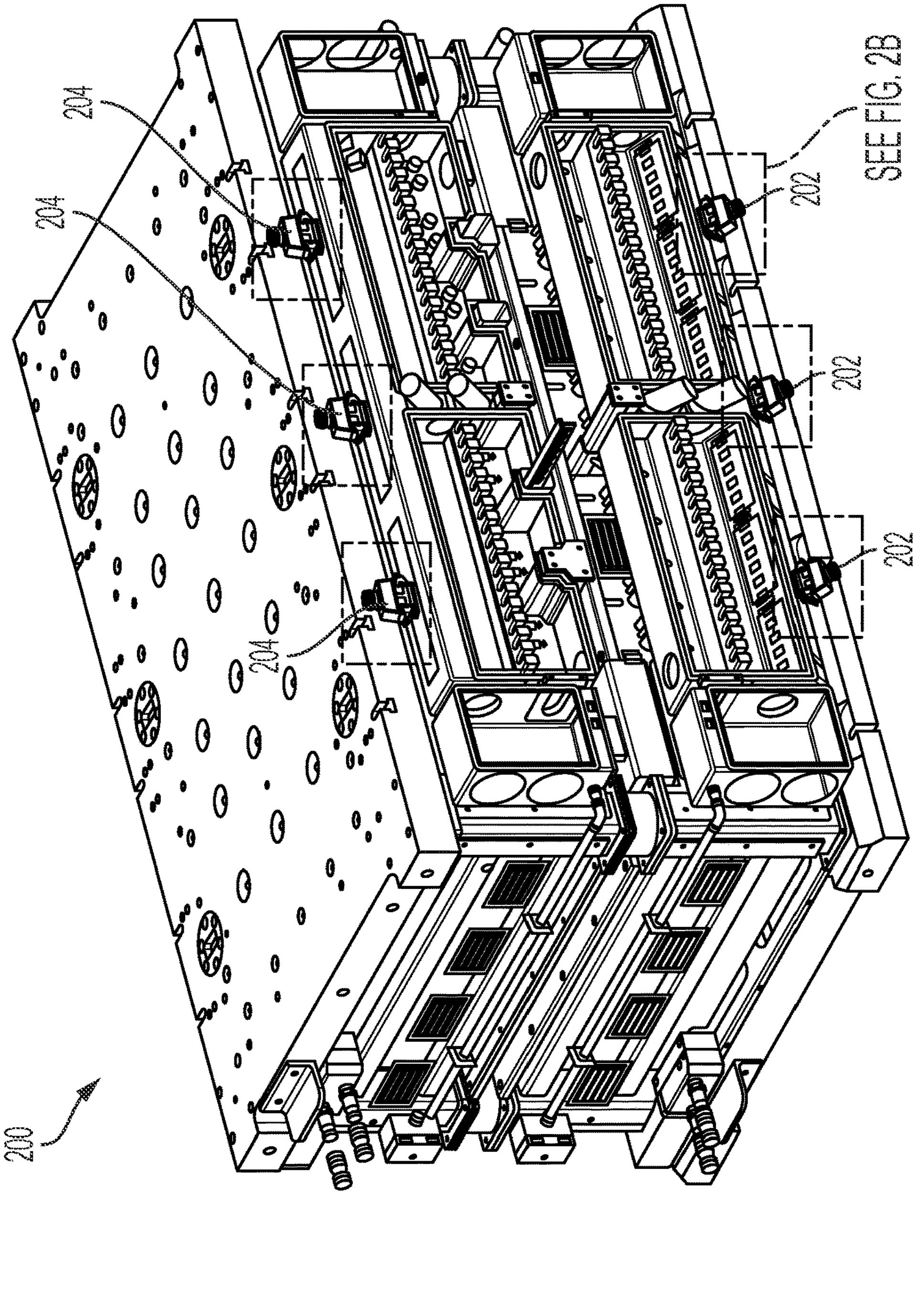
FIG. 2A shows a rear view of the removable hot box of FIG. 1.

FIG. 2A shows rear view 200 of removable hot box 102 of FIG. 1 with the addition of plurality of high density lower hot box portion electrical connectors 202 and plurality of high density upper hot box portion electrical connectors 204 that allow for quick disconnection of an off-line heating system. FIG. 2B shows a close-up view of FIG. 2A showing one electrical connector 206 of plurality of high density lower hot box portion electrical connectors 202 or plurality of high density upper hot box portion electrical connectors 204. Although FIG. 2A shows three electrical connectors for plurality of high density lower hot box portion electrical connectors 202 and plurality of high density upper hot box portion electrical connectors 204, this is just one non-limiting example. More or less than three electrical connectors, including one, may be used depending on the particular configuration of the hot box and the off-line heating system being used.

Figure 3B:
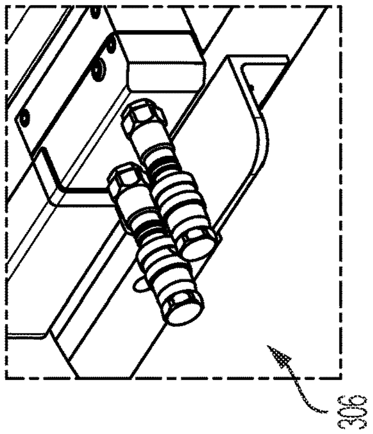
FIG. 3B shows a close-up view of FIG. 3A.
Figure 3A:
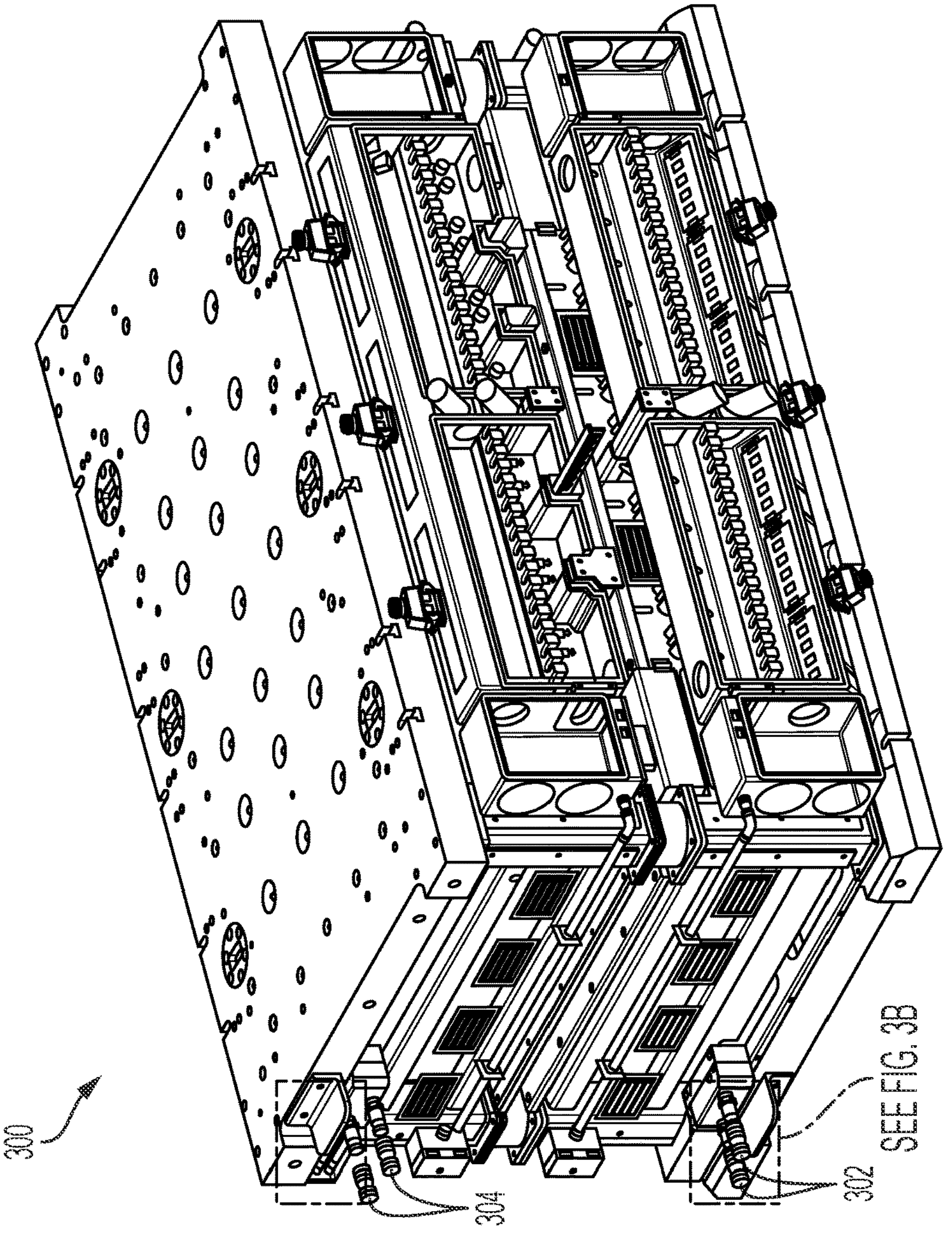
FIG. 3A shows a rear-view of the removable hot box of FIG. 1.

FIG. 3A shows rear view 300 of removable hot box 102 of FIG. 1 with the addition of plurality of lower hot box portion no-spill quick connectors 302 and plurality of upper hot box portion no-spill quick connectors 304 that allow for quick disconnection of an off-line cooling system. FIG. 3B shows a close-up view of FIG. 3A showing two no-spill quick connectors 306 of plurality of lower hot box portion no-spill quick connectors 302. Although FIG. 3A shows two no-spill quick connectors for plurality of lower hot box portion no-spill quick connectors 302 and plurality of upper hot box portion no-spill quick connectors 304, this is just one non-limiting example. More or less than two no-spill quick connectors, including one, may be used depending on the particular configuration of the hot box and the off-line cooling system being used.

Figure 4B:
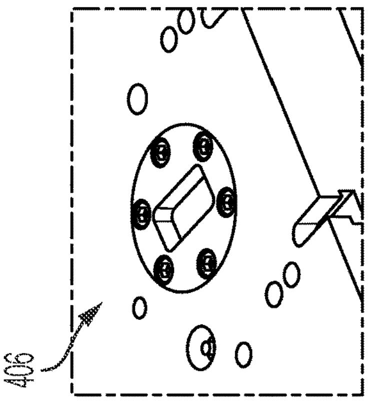
FIG. 4B shows a close-up view of FIG. 4A.
Figure 4A:
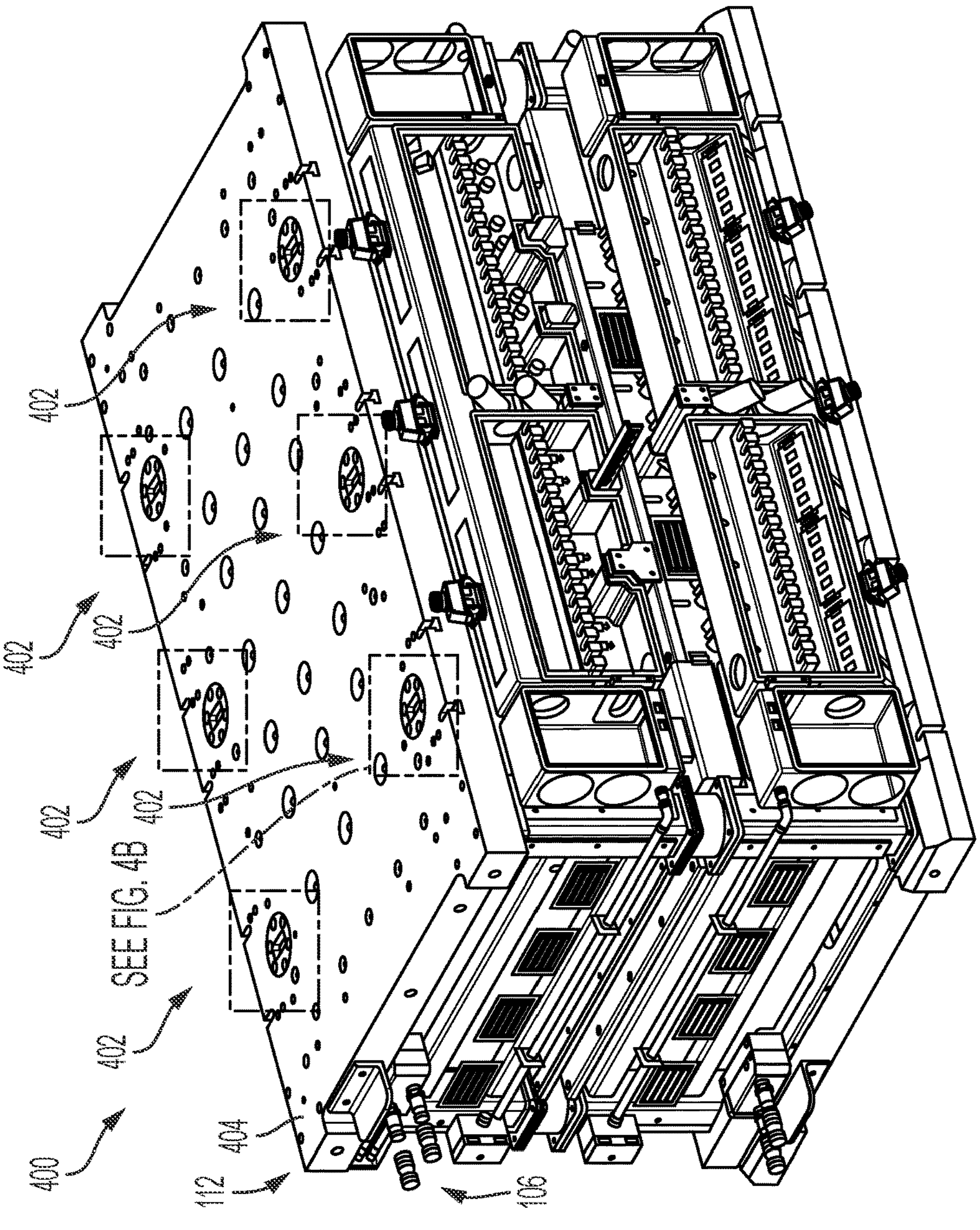
FIG. 4A shows rear view perspective of the removable hot box of FIG. 1.

FIG. 4A shows rear view perspective 400 of removable hot box 102 of FIG. 1 with the addition of plurality of upper hot box portion clamping structures 402 on top surface 404 of upper base plate 112 of upper hot box portion 106 that allow for clamping, i.e., hydraulic clamping, hot box 102 to press 104. FIG. 4B shows a close-up view of FIG. 4A showing details of one upper hot box portion clamping structure 406 of plurality of upper hot box portion clamping structures 402. Although FIG. 4A shows six upper hot box portion clamping structures for plurality of upper hot box portion clamping structures 402, this is just one non-limiting example. More or less than six upper hot box portion clamping structures, including one, may be used depending on the particular configuration of the hot box and the press being used.

Figure 5B:
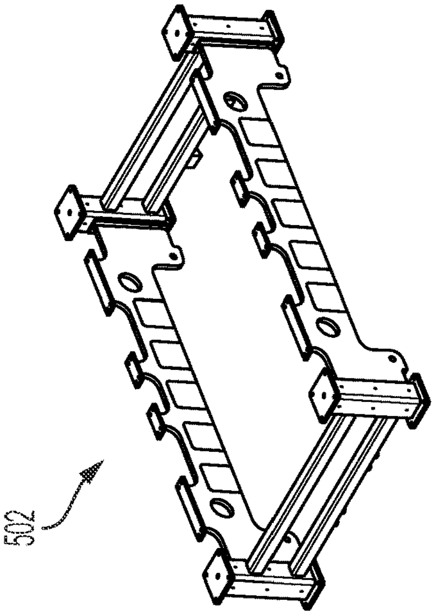
FIG. 5B shows a close-up view of the upper hot box portion internal frame of FIG. 5A.
Figure 5C:
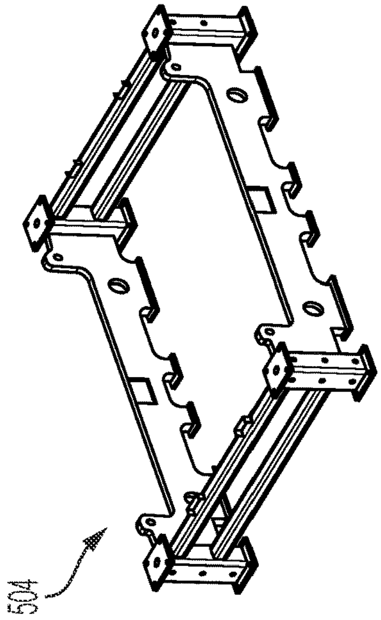
FIG. 5C shows a close-up view of the lower hot box portion internal frame of FIG. 5B.
Figure 5A:
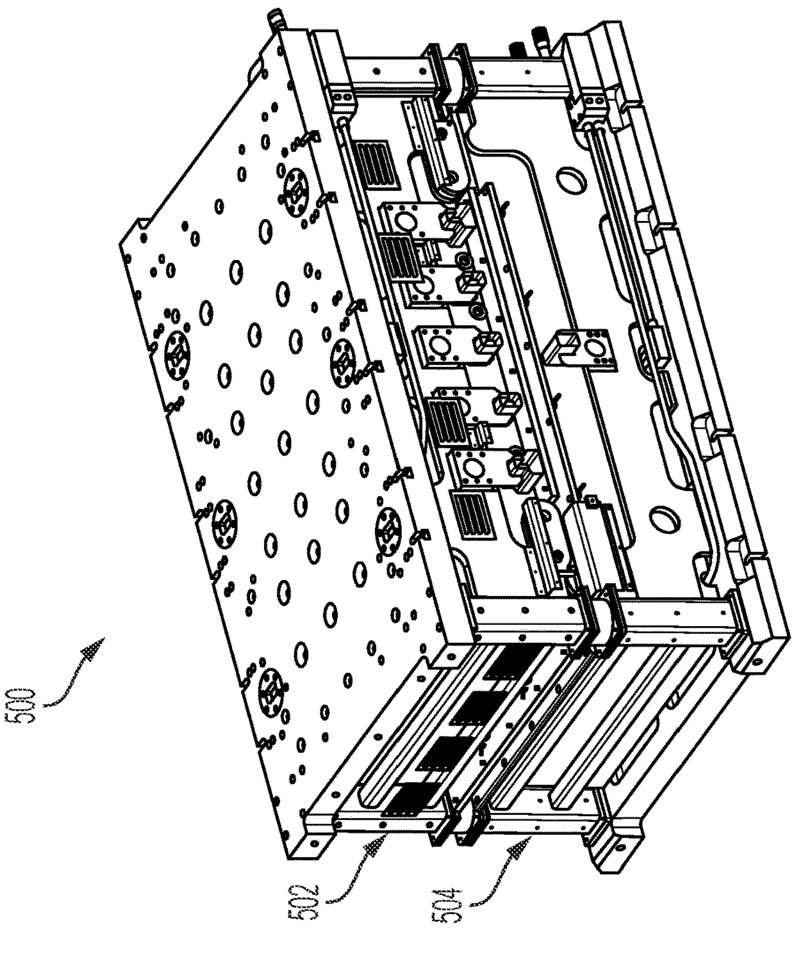
FIG. 5A shows a rear-view perspective of the removable hot box of FIG. 1.

FIG. 5A shows rear view perspective 500 of removable hot box 102 of FIG. 1 with the addition of upper hot box portion internal frame 502 arranged in upper hot box portion 106 and lower hot box portion internal frame 504 arranged in lower hot box portion 108 that allow for supporting and strengthening hot box 102 when to in press 104. FIG. 5B shows a close-up view of upper hot box portion internal frame 502 and FIG. 5C shows a close-up view of lower hot box portion internal frame 504.

Figure 6B:
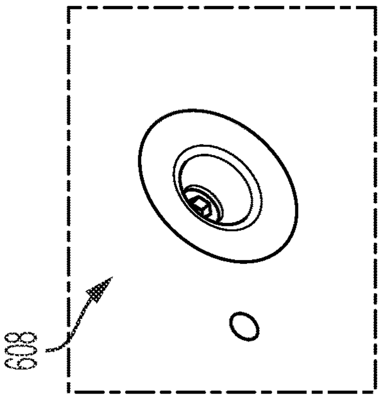
FIG. 6B shows a close-up view of FIG. 6A.
Figure 6A:
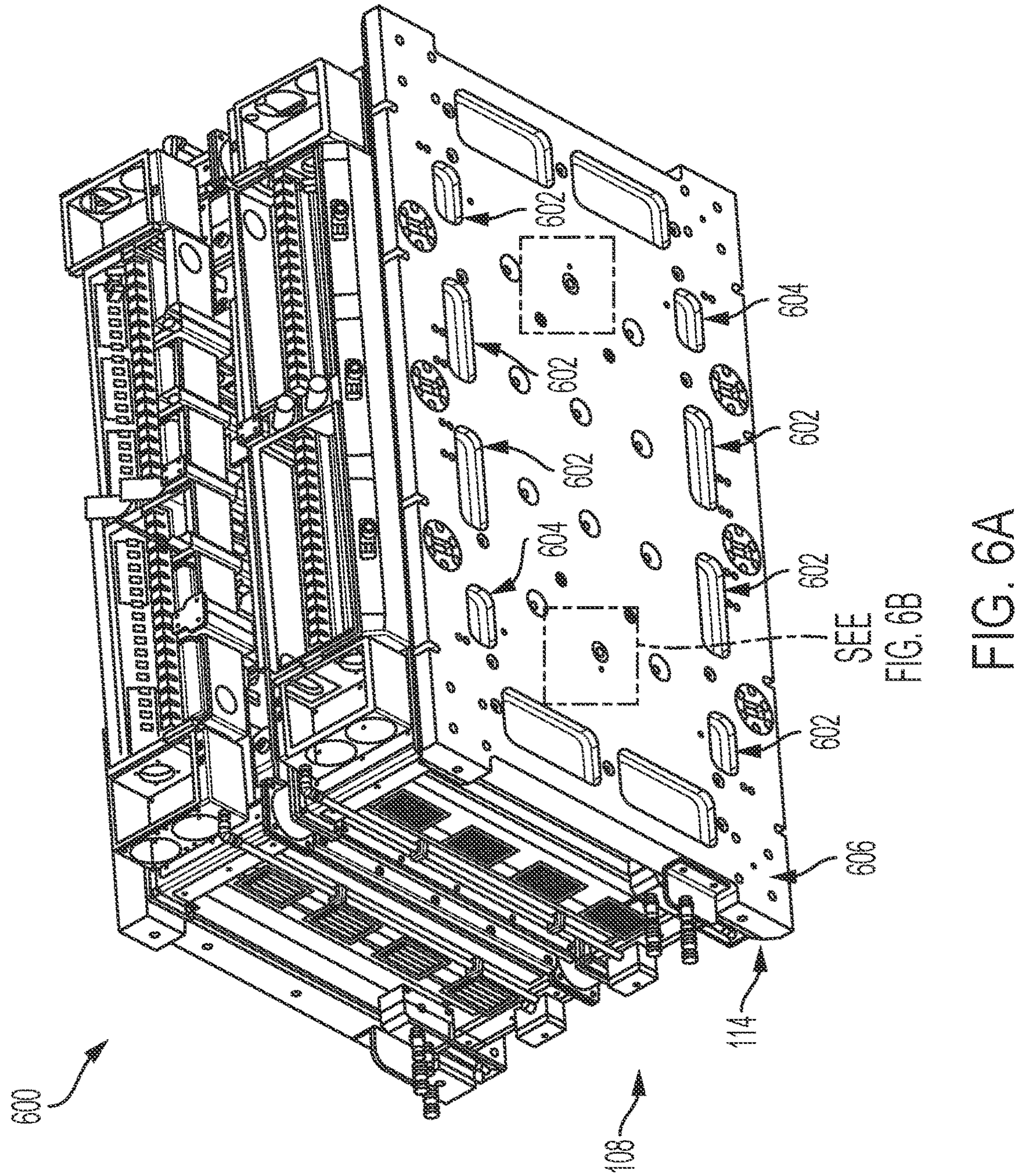
FIG. 6A shows a rear-view perspective of the removable hot box of FIG. 1.

FIG. 6A shows rear view perspective 600 of removable hot box 102 of FIG. 1 with the addition of plurality of lower hot box portion clamping structures 602 and plurality of locating structures 604 on bottom surface 606 of lower base plate 114 of lower hot box portion 108. Plurality of lower hot box portion clamping structures 602 allow for clamping, i.e., hydraulic clamping, hot box 102 to press 104. Plurality of lower hot box portion clamping structures 602 are similar to plurality of upper hot box portion clamping structures 402. Plurality of locating structures 604 allow for repeatable indexing or positioning of hot box 102 in press 104. FIG. 6B shows a close-up view of FIG. 6A showing details of one locating structure 608 of plurality of locating structures 604. Although FIG. 6A shows six lower hot box portion clamping structures for plurality of lower hot box portion clamping structures 602 and shows two locating structures of plurality of locating structures 604, these are just one non-limiting example. More or less than six lower hot box portion clamping structures and more or less than two locating structures, including one, may be used depending on the particular configuration of the hot box and the press being used.

Figure 7:
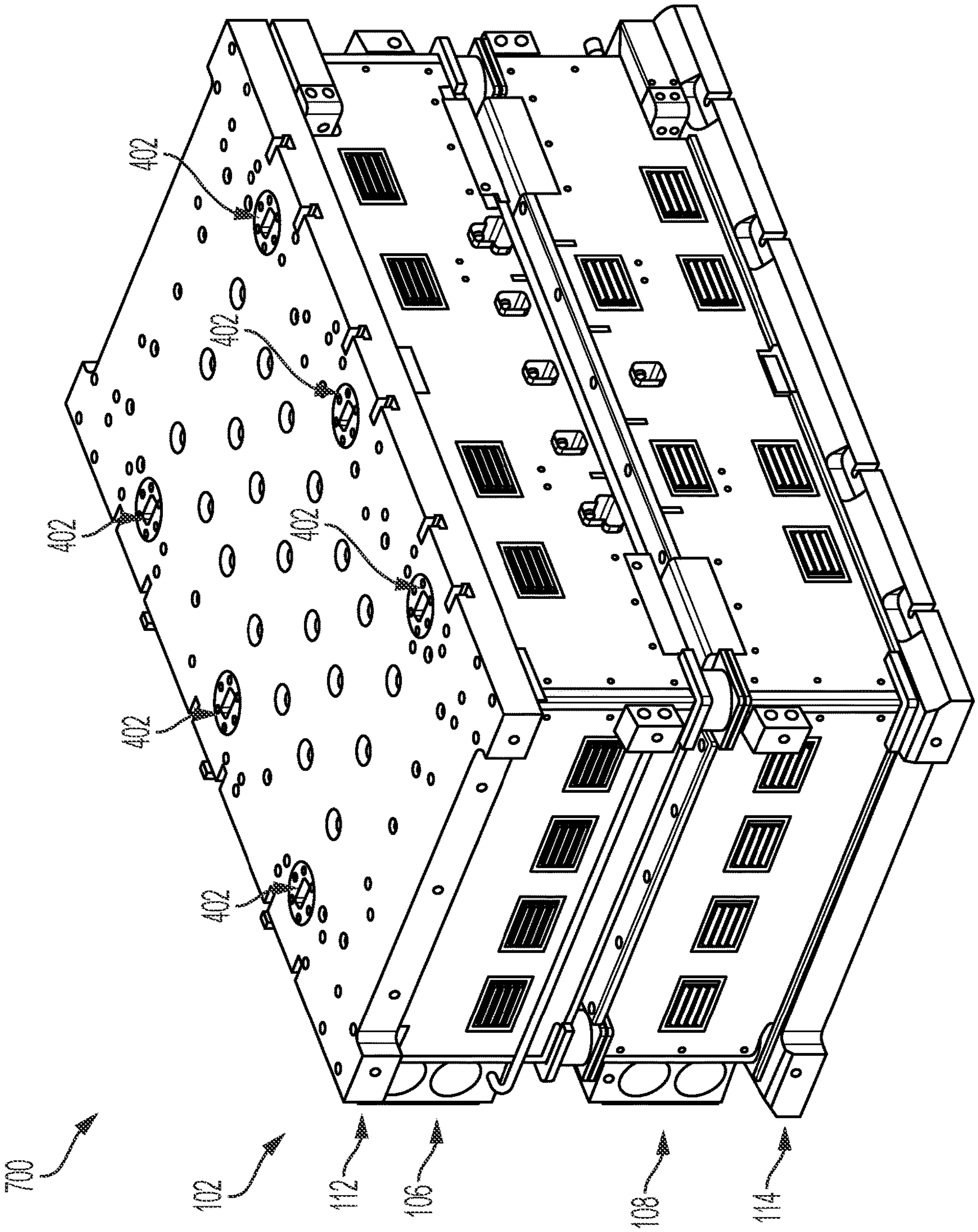
FIG. 7 shows a front view perspective of the removable hot box of FIG. 1.

FIG. 7 shows a front view perspective 700 of removable hot box 102 of FIG. 1. As described in FIG. 1, removable hot box 102 comprises lower hot box portion 106 and upper hot box portion 108. Upper base plate 112 is arranged on a top surface of upper hot box portion 106 and lower base plate 114 is arranged on a bottom surface of lower hot box portion 108. Plurality of upper hot box portion clamping structures 402, as shown in FIG. 4, are arranged on a top surface of upper base plate 112.

Figure 8:
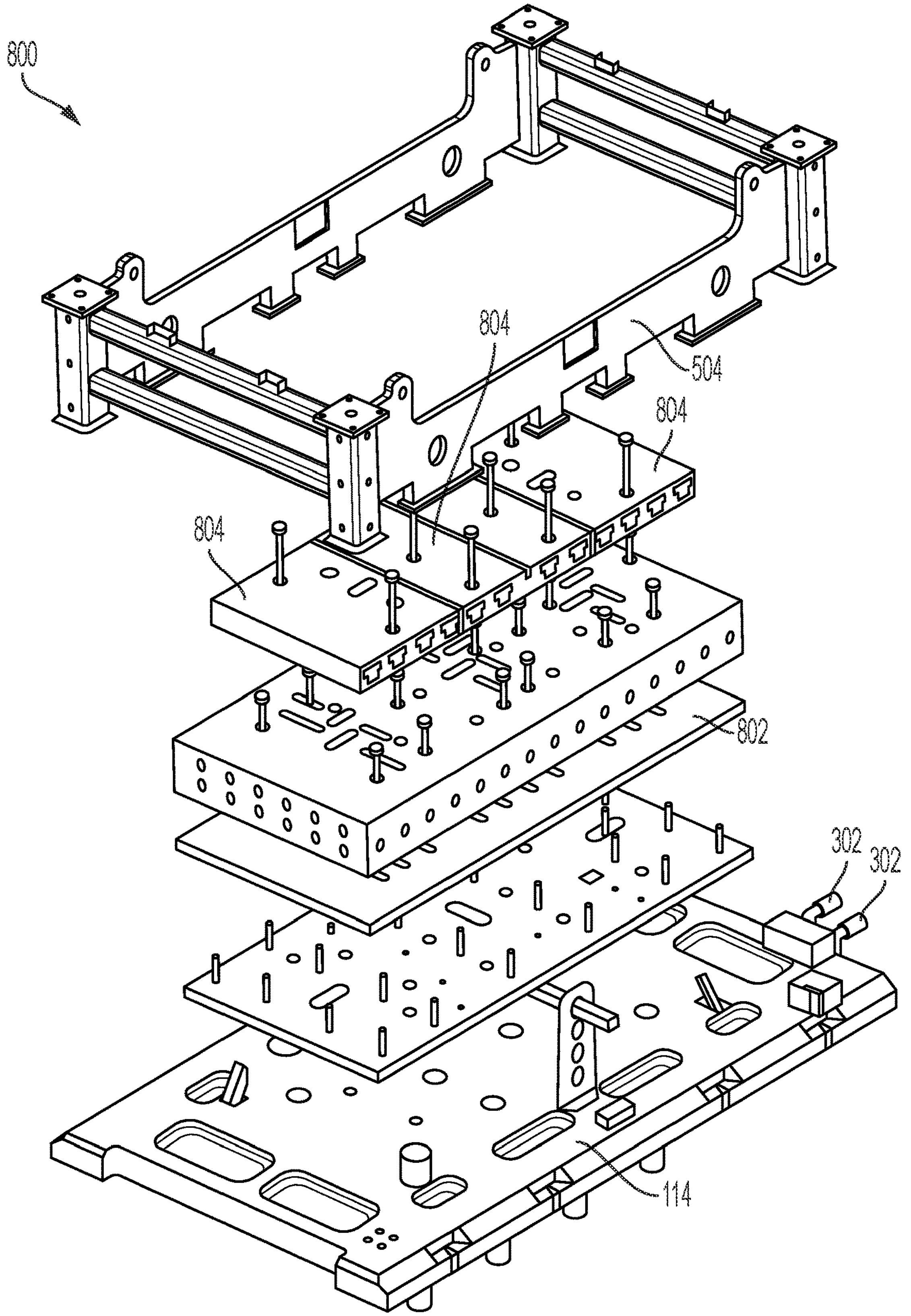
FIG. 8 and FIG. 9 show lower half exploded views of the removable hot box of FIG. 1.
Figure 9:
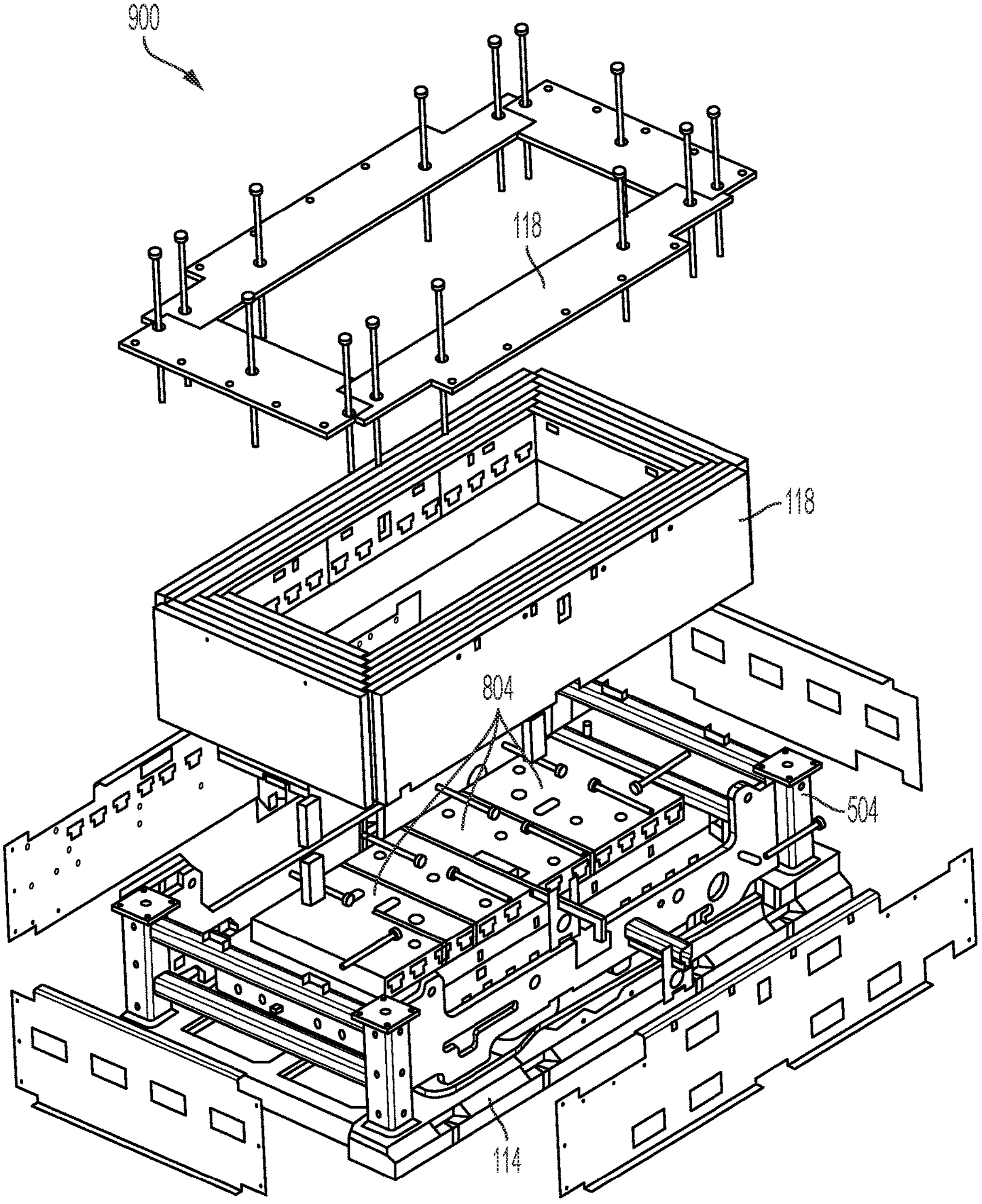

FIG. 8 and FIG. 9 show lower half exploded view 800 and 900 of removable hot box 102 of FIG. 1. Lower hot box portion 108 comprises lower base plate 114, lower insulation layer 802, lower heating platen 804, lower hot box portion internal frame 504. Lower base plate 114 comprises plurality of lower hot box portion no-spill quick connectors 302. Lower insulation layer 802 is arranged between lower base plate 114 and lower heating platen 802. Lower heating platen 804 is received within a lower housing of lower hot box portion 108 and can be configured to support a lower die. The lower housing can comprise lower base plate 114 and lower side walls, positioned above lower base plate 114. The lower heating platen 804 defines a lower slot that is configured to receive a lower coupler for operatively retaining the lower die to lower heating platen 802. The lower side walls define a lower access passage that is configured to provide access to the lower slot for operative insertion and removal of the lower coupler. Lower base plate 114, lower insulation layer 802, and lower heating platen 804 collectively define at least one lower lift-pin passage that is configured to receive at least one lower-die lift pin for operative engagement with the lower die and separation of the lower die from lower hot box portion 108. Lower base plate 114, lower insulation layer 802, and lower heating platen 804 also collectively define lower bolt passages. Lower hot box portion 108 can further comprise lower bolts that extend through the lower bolt passages and spring-loaded lower nut assemblies that are operatively coupled to the lower bolts and configured to permit lower hot box portion 108 to expand and contract without damage to lower hot box portion 108.

Figure 10:
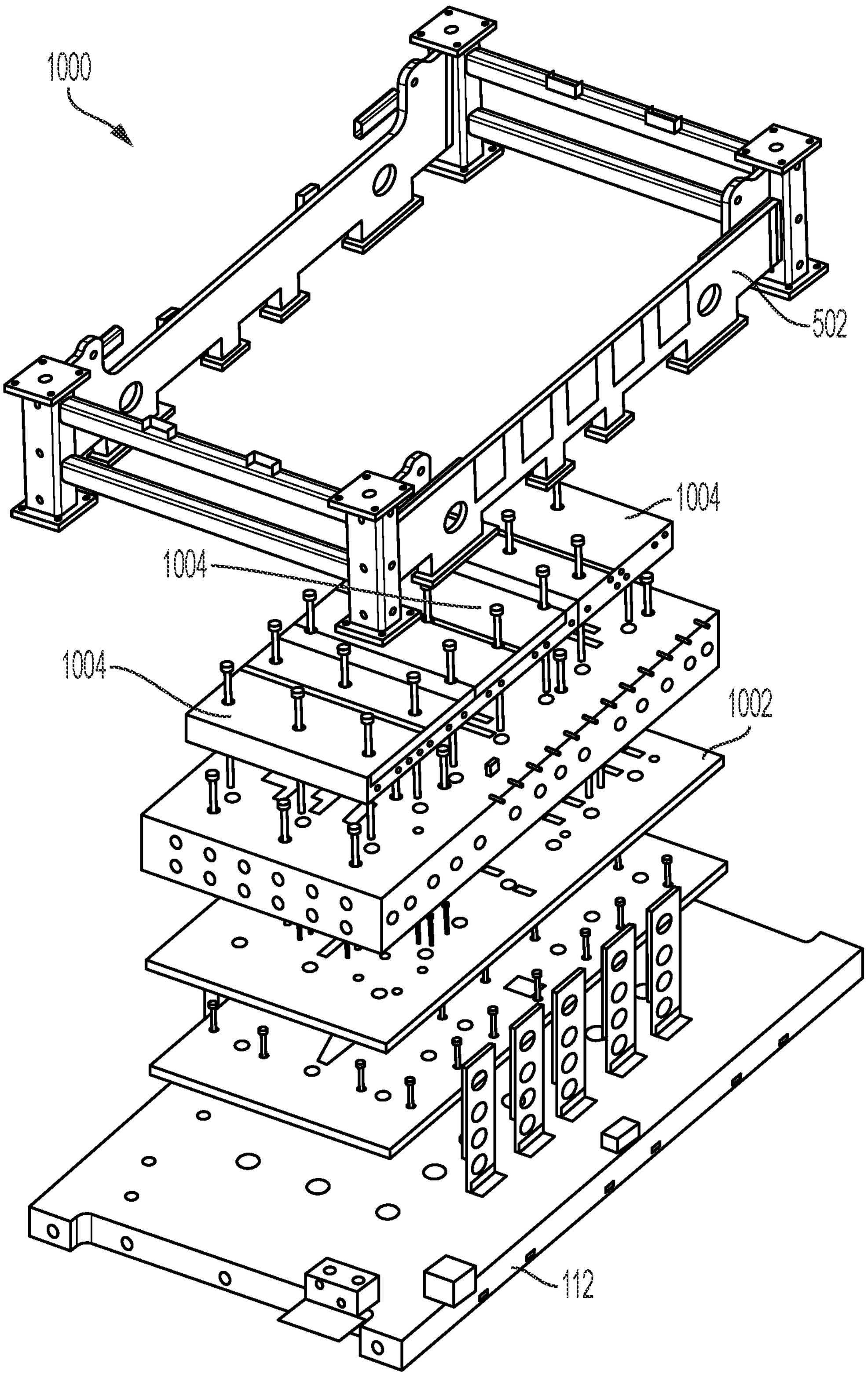
FIG. 10 and FIG. 11 shows upper half exploded views of the removable hot box of FIG. 1.
Figure 11:
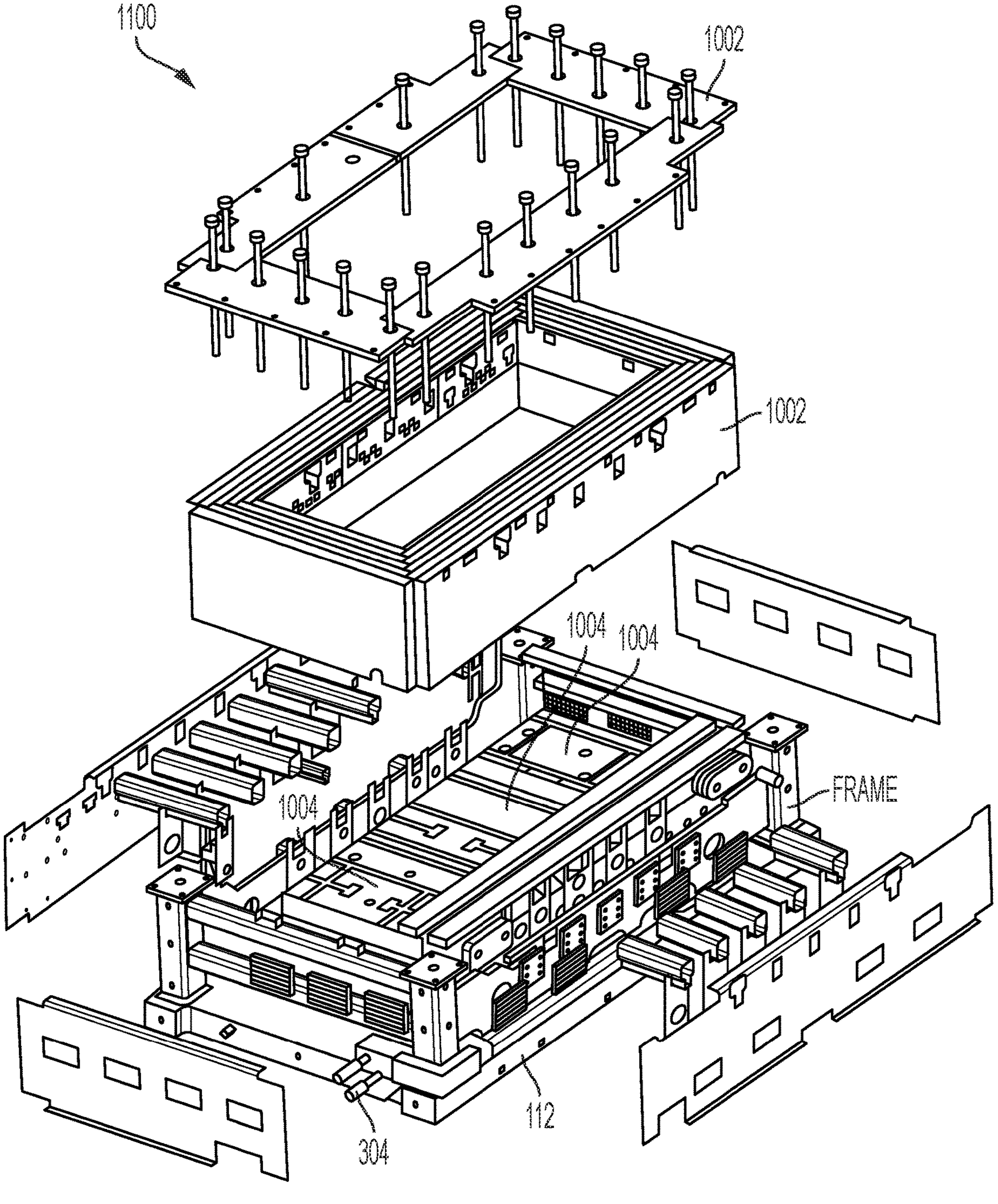

FIG. 10 and FIG. 11 show upper half exploded view 1000 and 1100 of removable hot box 102 of FIG. 1. Upper hot box portion 106 comprises upper base plate 112, upper insulation layer 1002, upper heating platen 1004, upper hot box portion internal frame 502. Upper base plate 112 comprises plurality of upper hot box portion no-spill quick connectors 302. Upper insulation layer 1002 is arranged between upper base plate 112 and upper heating platen 1002. Upper heating platen 10104 is received within an upper housing of upper hot box portion 106 and can be configured to support an upper die. Upper base plate 112, upper insulation layer 1002, and upper heating platen 1004 collectively define upper bolt passages. Upper hot box portion 106 further comprises upper bolts that extend through the upper bolt passages and spring-loaded lower nut assemblies that are operatively coupled to the upper bolts and configured to permit the upper hot box portion to expand and contract without damage to the upper hot box portion.

Figure 12:
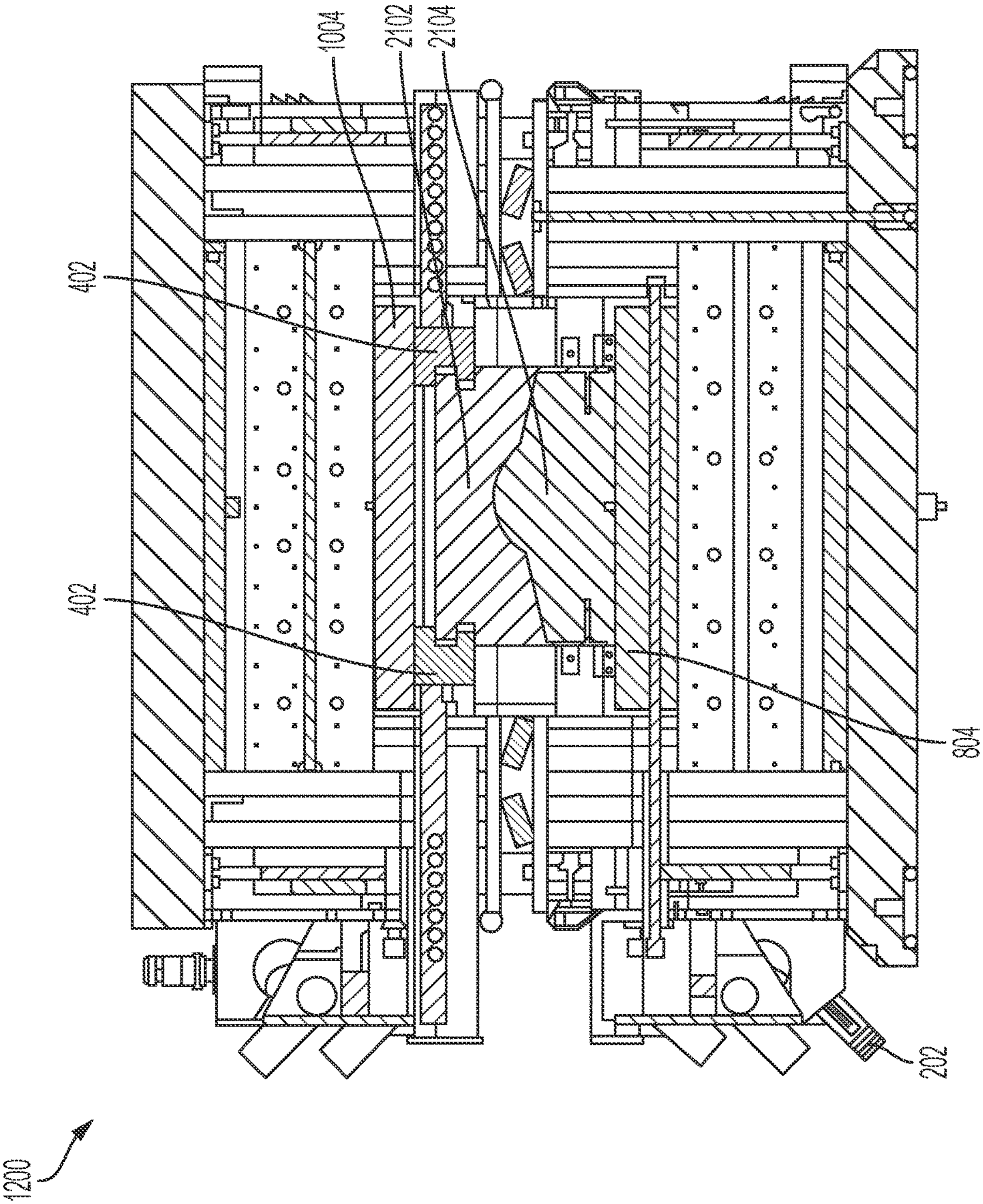
FIG. 12 shows a cross-sectional view of the removable hot box of FIG. 1.
Figure 21:
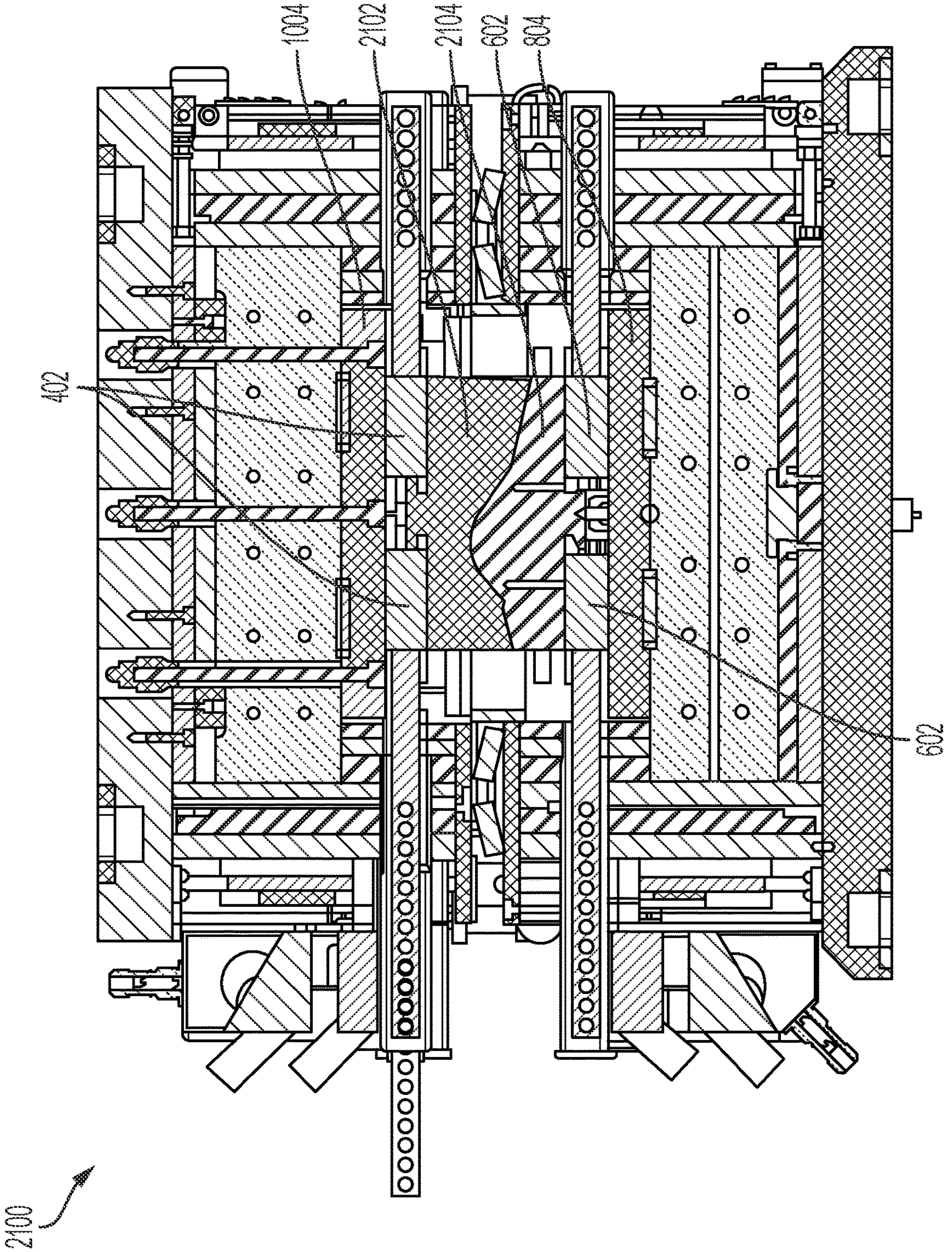
FIG. 21 shows another cross-sectional view of the removable hot box of FIG. 1.

FIG. 12 and FIG. 21 shows cross sectional view 1200 and 2100 of removable hot box 102 of FIG. 1. As shown in FIG. 12 and FIG. 21, lower hot box portion 108 comprises lower base plate 114, lower insulation layer 802, lower heating platen 804, lower hot box portion internal frame 504. Lower base plate 114 comprises plurality of lower hot box portion no-spill quick connectors 302. Lower insulation layer 802 is arranged between lower base plate 114 and lower heating platen 802. Lower box portion 108 also comprises plurality of high density lower hot box portion electrical connectors 202. Upper hot box portion 106 comprises upper base plate 112, upper insulation layer 1002, upper heating platen 1004, upper hot box portion internal frame 502. Upper base plate 112 comprises plurality of upper hot box portion no-spill quick connectors 302. Upper insulation layer 1002 is arranged between upper base plate 112 and upper heating platen 1002. Lower hot box portion 106 and upper hot box portion 108 are joined and securely connected together by flexible heat seal 110. Forming tool 1202 is arranged between lower hot box portion 106 and upper hot box portion 108. Plurality of upper hot box portion clamping structures 402 are arranged on top surface 404 of upper base plate 112 of upper hot box portion 106 that allow for clamping, i.e., hydraulic clamping, hot box 102 to press 104. Between upper hot box portion 106 and lower hot box portion 108 is upper die half 2102 and lower die half 2104.

Figure 13:
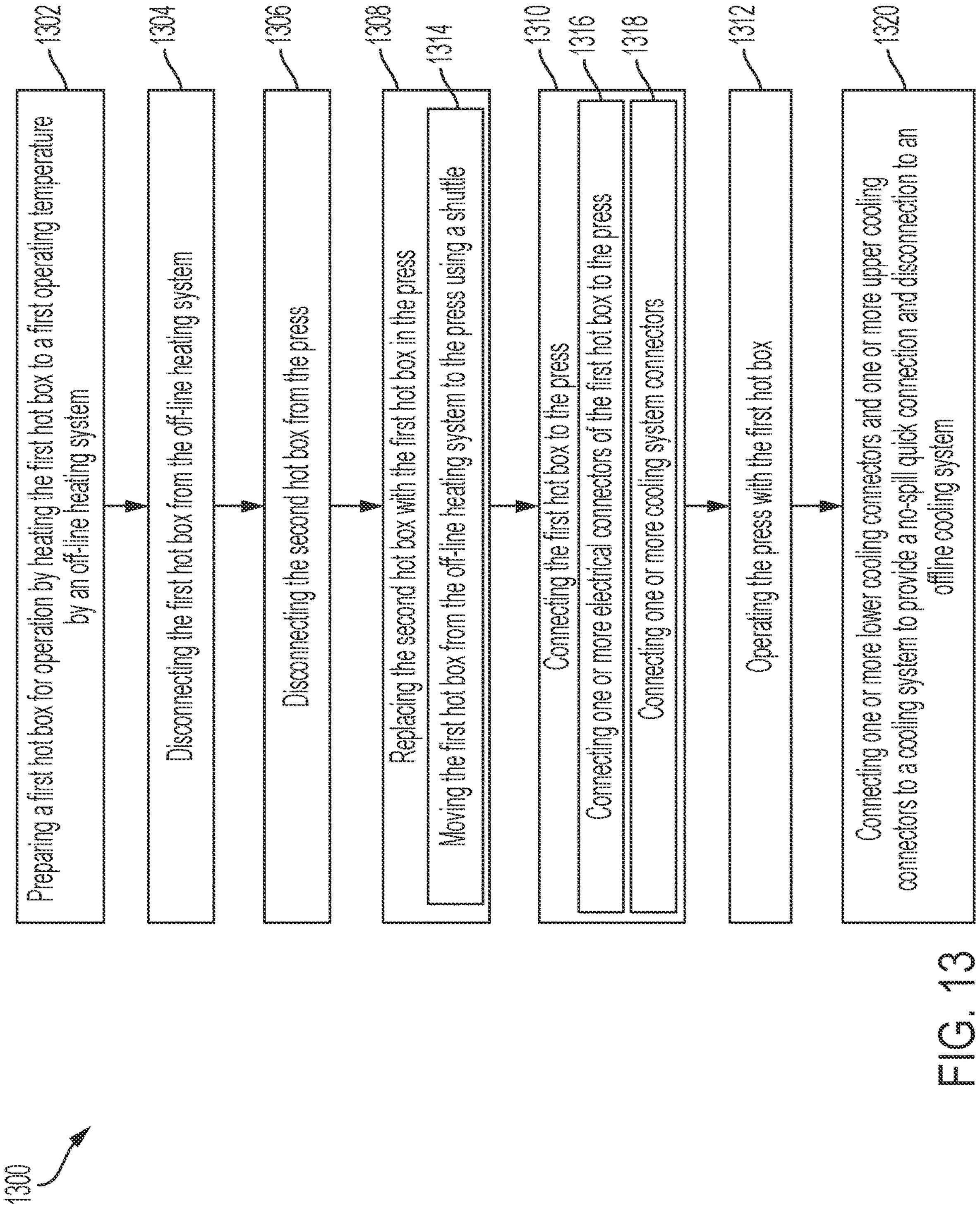
FIG. 13 shows a flowchart of a method for operating a press with an interchangeable first hot box and an interchangeable second hot box according to examples of the present disclosure.
Figure 14:
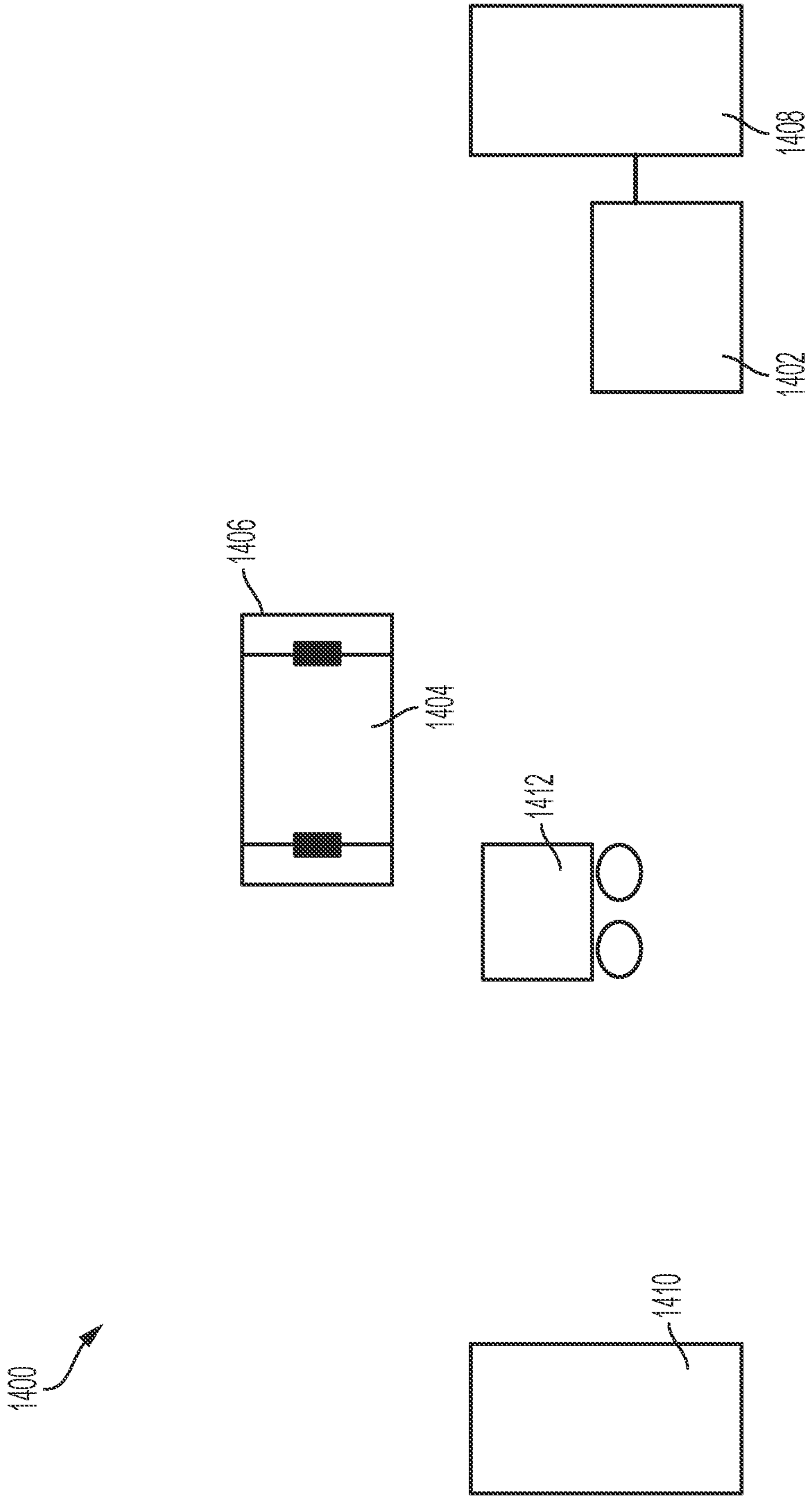
FIG. 14, FIG. 15, FIG. 16, FIG. 17, FIG. 18, and FIG. 19 show simplified block diagrams of the elements described in FIG. 13.
Figure 15:
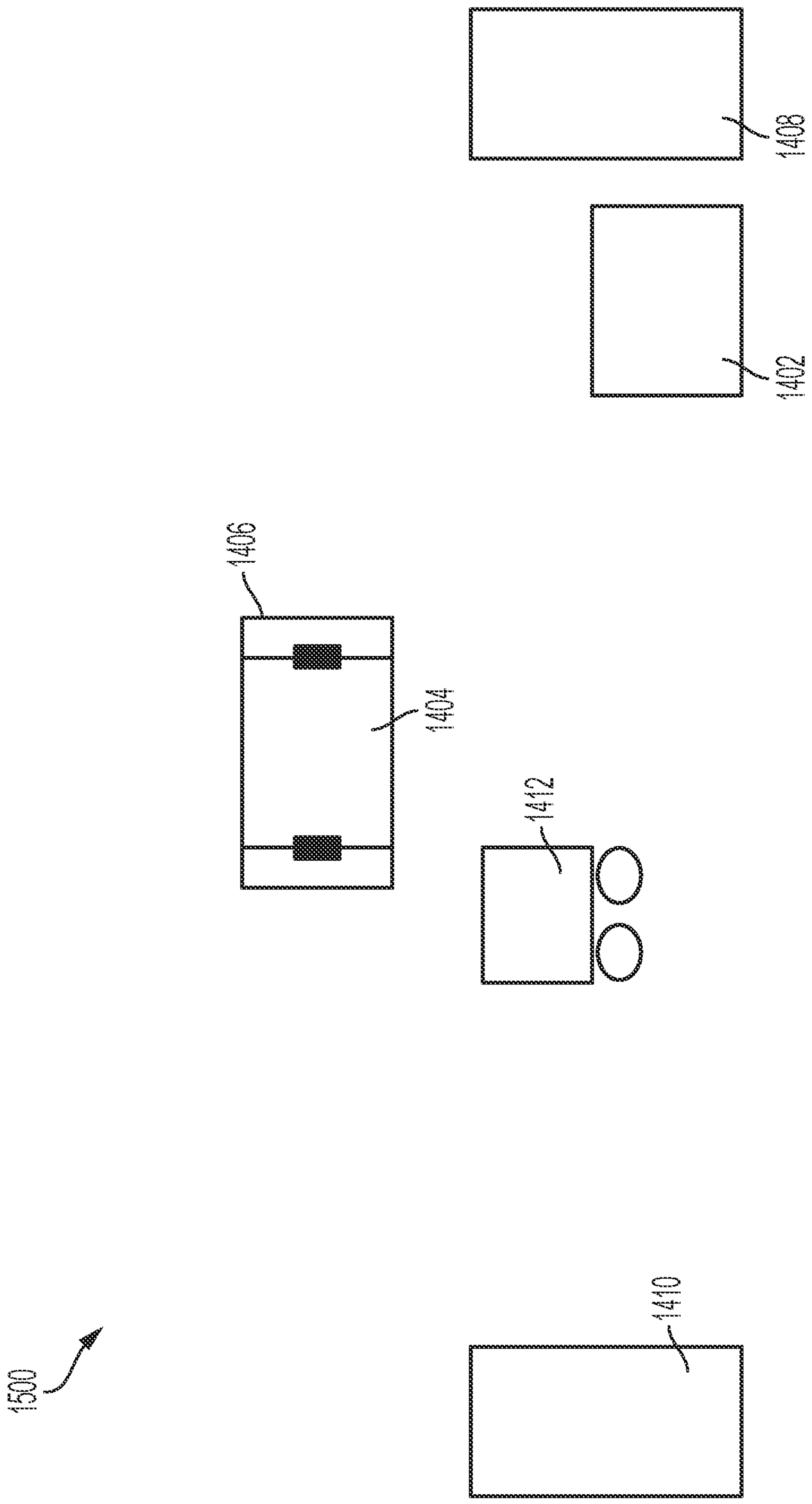
Figure 16:
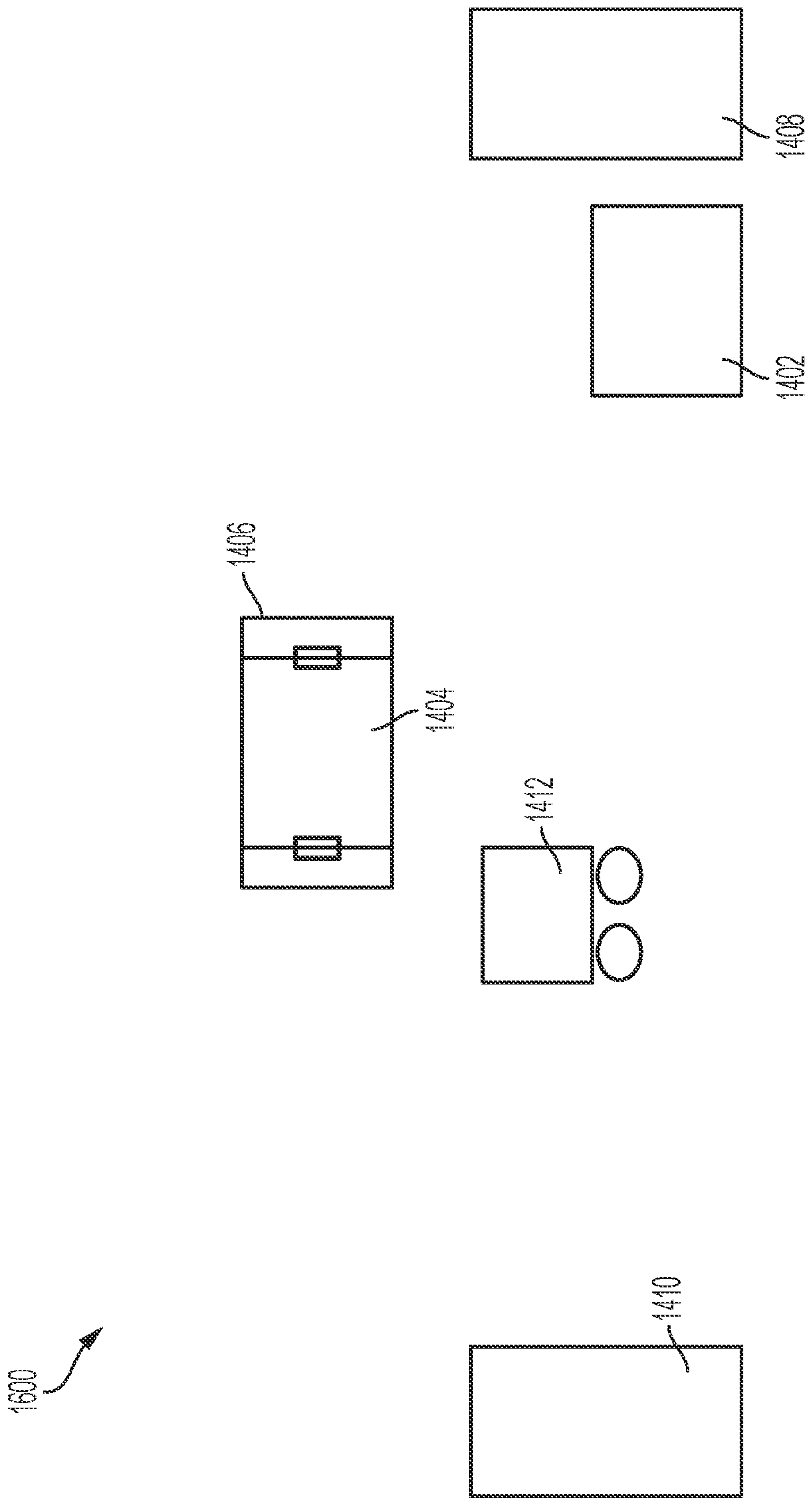
Figure 17:
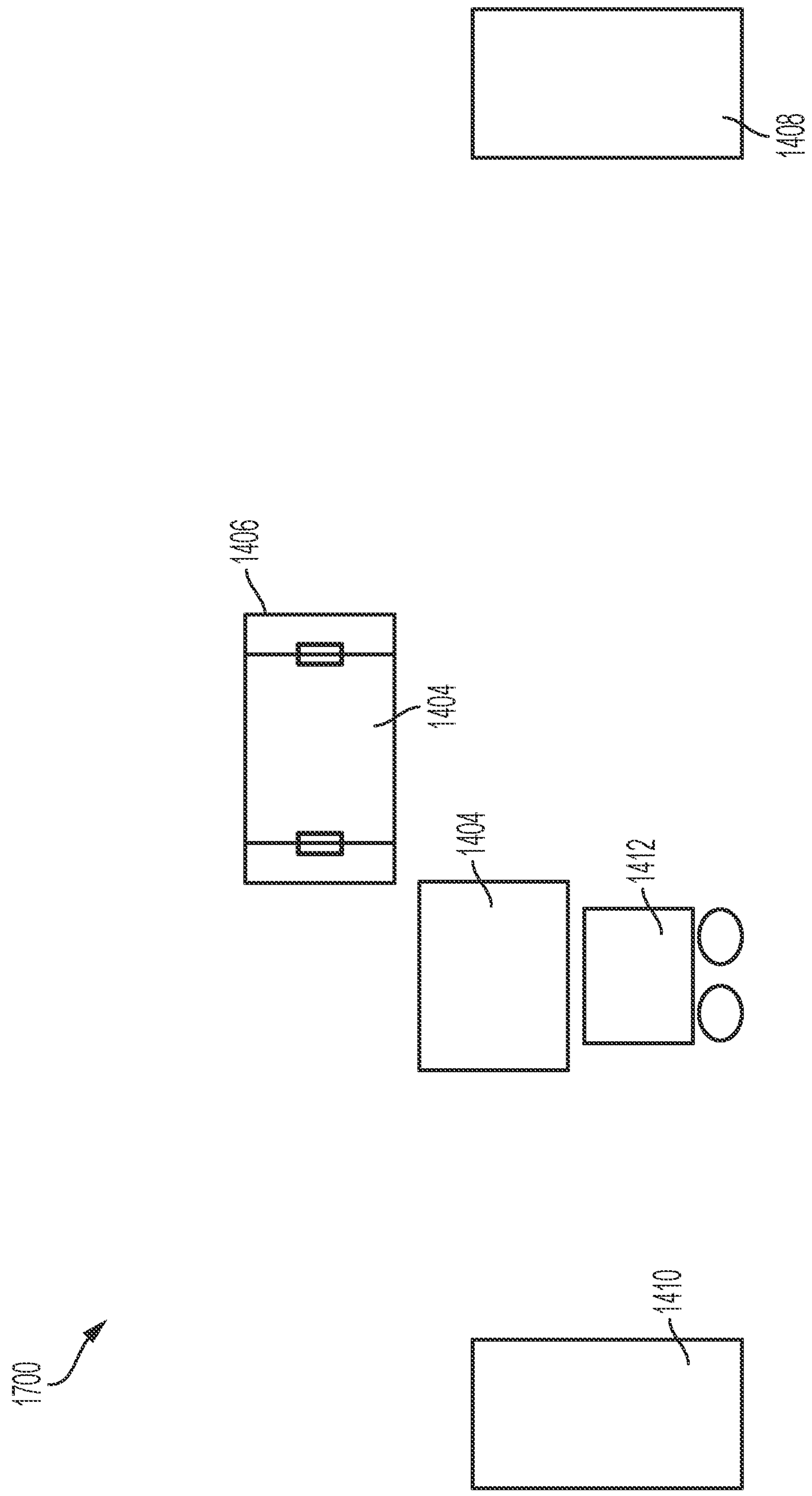
Figure 18:
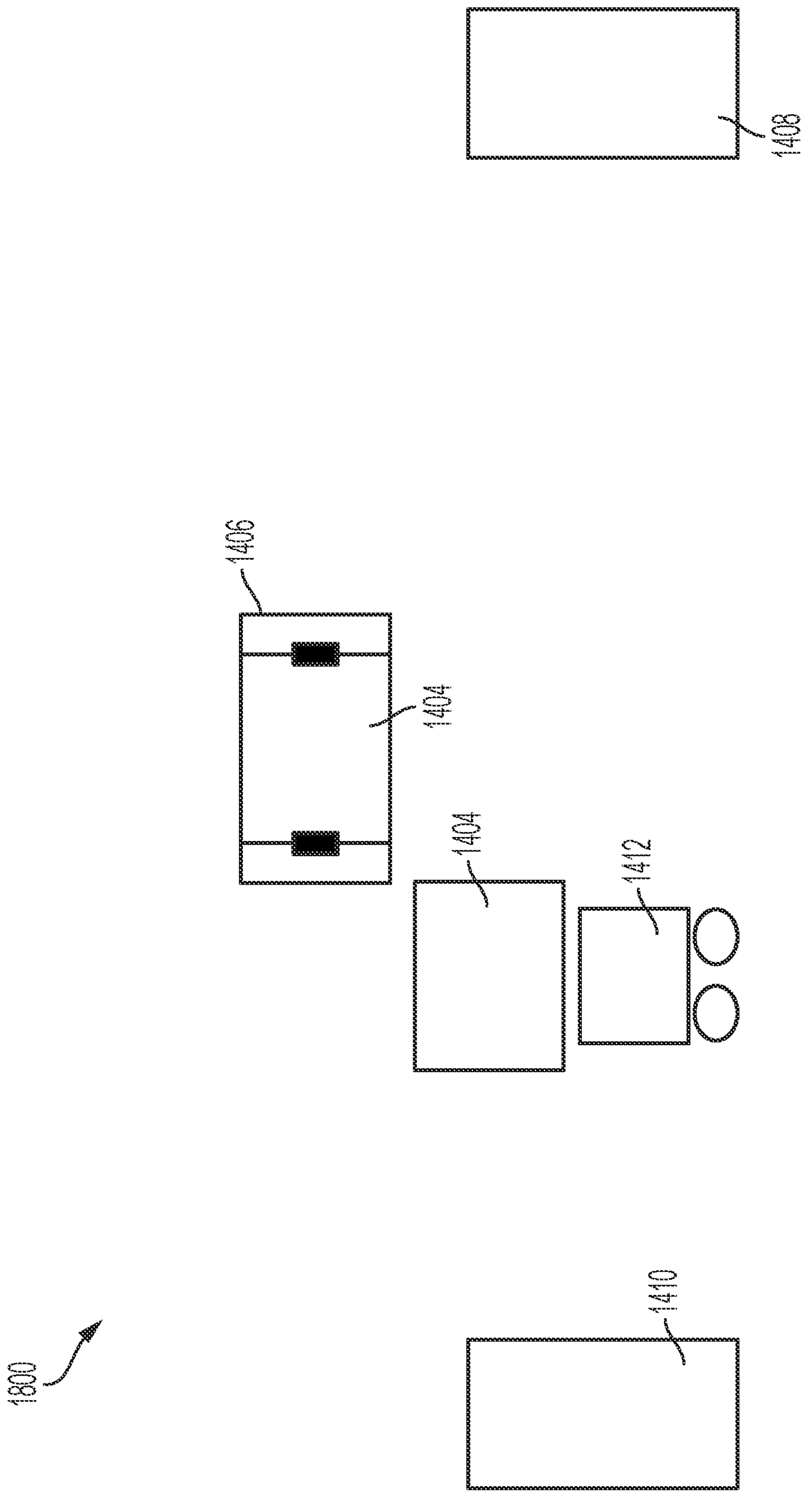
Figure 19:
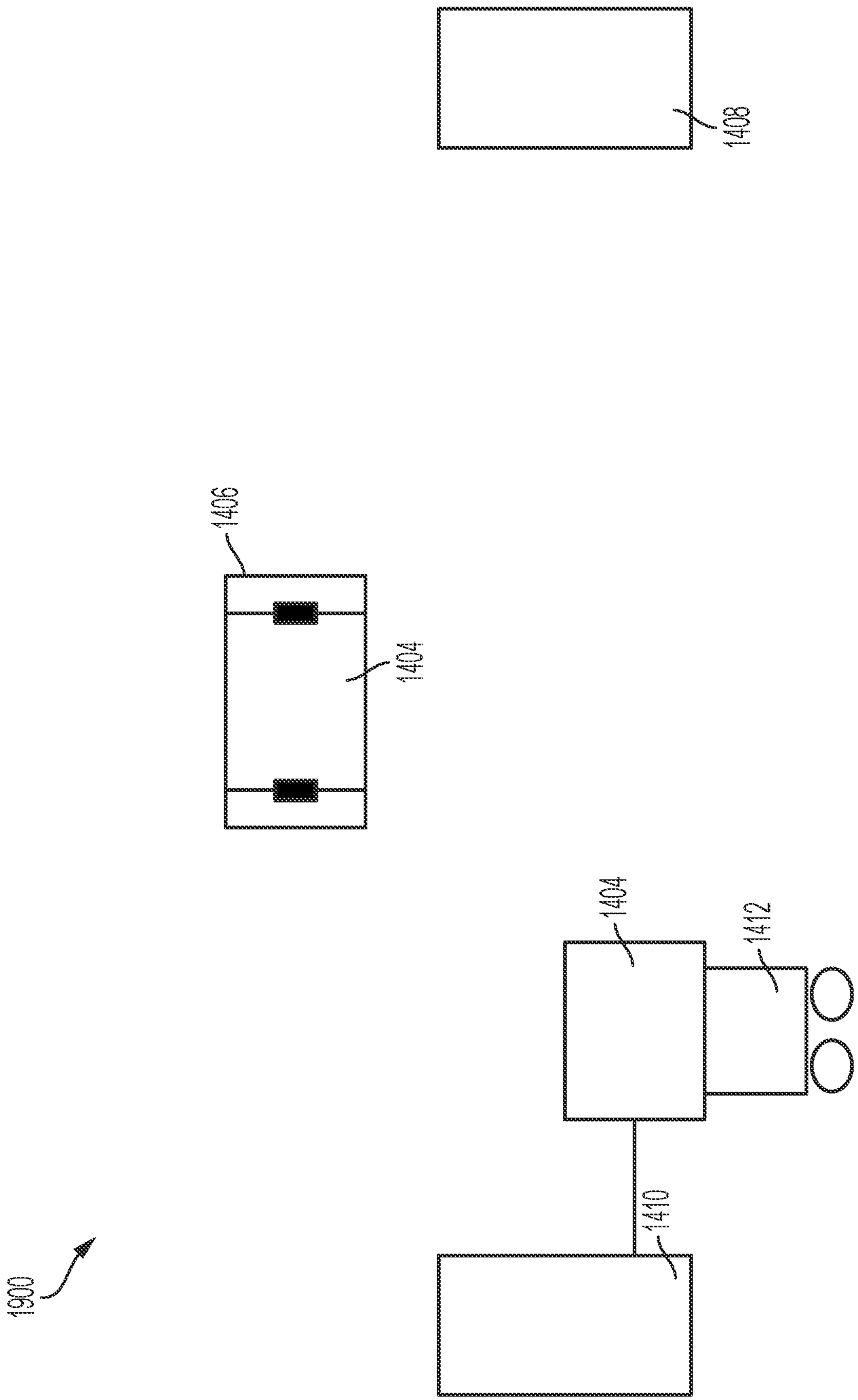

FIG. 13 shows flowchart 1300 of a method for operating a press with an interchangeable first hot box and an interchangeable second hot box according to examples of the present disclosure. The method comprises preparing a first hot box for operation by heating the first hot box to a first operating temperature by an off-line heating system, as in 1302. For example, the first operating temperature comprises a temperature range from about 800° F. to about 2000° F. for forming a part made from aluminum, titanium, stainless steel, or oxidation-corrosion-resistant materials such as austenitic nickel-chromium-based superalloys. As shown in FIG. 14, first hot box 1402 is connected to off-line heating system 1408. Also shown, second hot box 1404 is connected to press 1406, as represented by solid filled blocks. The method continues by disconnecting the first hot box from the off-line heating system, as in 1304. As shown in FIG. 15, first hot box 1402 is disconnected to off-line heating system 1408. The method continues by disconnecting the second hot box from the press, as in 1306. As shown in FIG. 16, second hot box 1404 is disconnected from press 1406, as represented by non-filled blocks. The method continues by replacing the second hot box with the first hot box in the press, as in 1308. For example, the replacing can further comprise moving the second hot box from the press to an off-line cooling system using a shuttle, as in 1314. As shown in FIG. 17, second hot box 1404 is removed from press 1406 and placed on shuttle 1412 and first hot box 1402 is placed in press 1406. The method continues by connecting the first hot box to the press, as in 1310. For example, the connecting can further comprise connecting one or more electrical connectors of the first hot box to the press, as in 1316. In another example, the connecting can further comprise connecting one or more cooling system connectors of the first hot box to the press, as in 1318. As shown in FIG. 18, first hot box 1402 is connected to press 1406, as represented by solid filled blocks. The method continues by operating the press with the first hot box, as in 1312. In some examples, the method can further comprises connecting one or more lower cooling connectors and one or more upper cooling connectors to a cooling system to provide a no-spill quick connection and disconnection to the cooling system, as in 1320. As shown in FIG. 19, second hot box 1404 is connected to off-line cooling system 1410.

FIG. 14, FIG. 15, FIG. 16, FIG. 17, FIG. 18, and FIG. 19 show simplified block diagrams 1400, 1500, 1600, 1700, 1800, and 1900 of the elements described in FIG. 13, which include first hot box 1402, second hot box 1404, press 1406, off-line heating system 1408, off-line cooling system 1410, and shuttle 1412. First hot box 1402 and second hot box 1404 are hot box 102 and press 1406 is press 104.

In FIG. 13, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 13 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Figure 20:
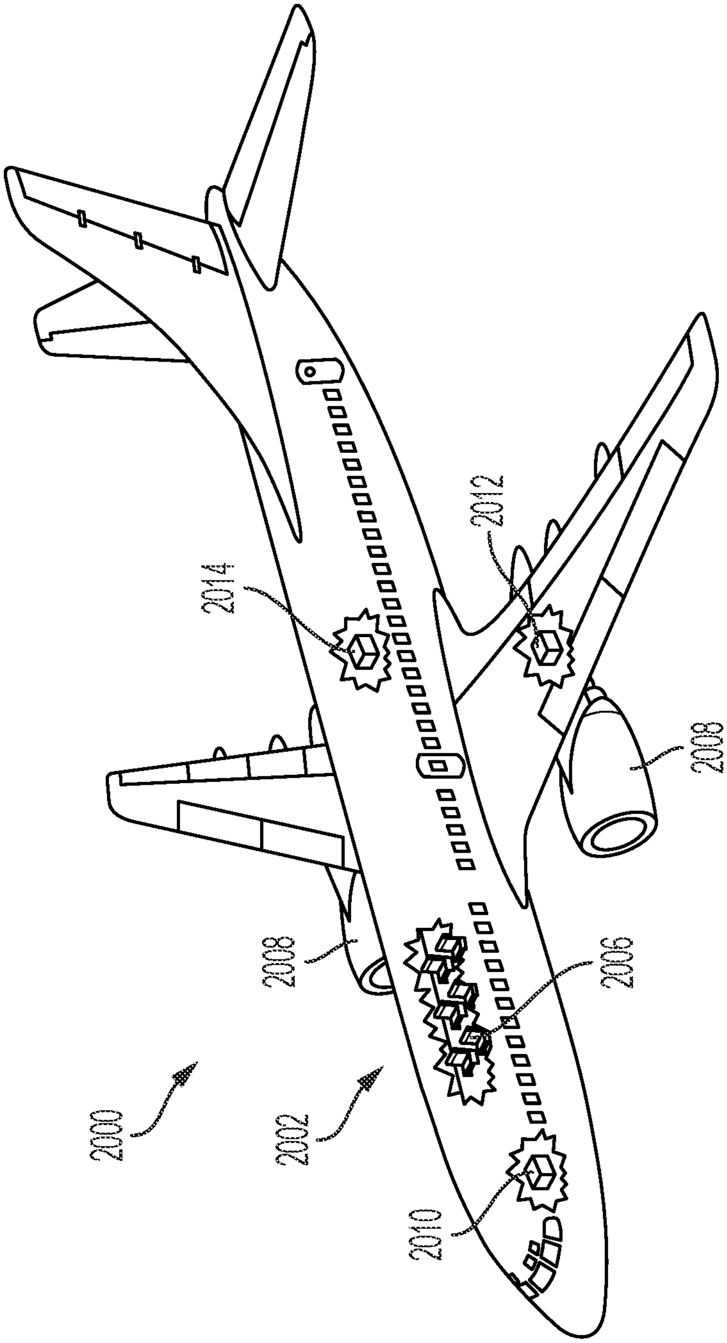
FIG. 20 illustrates an airplane according to examples of the present disclosure.

Examples of the present disclosure may be described in the context of aircraft manufacturing and method 1300 as shown in FIG. 13 and aircraft 2000 as shown in FIG. 20. During pre-production, illustrative method 1300 may include specification and design of aircraft 200 and material procurement. During production, component and subassembly manufacturing and system integration of aircraft 2000 may take place. Thereafter, aircraft 2000 may go through certification and delivery to be placed in service. While in service, aircraft 2000 may be scheduled for routine maintenance and service. Routine maintenance and service may include modification, reconfiguration, refurbishment, etc. of one or more systems of aircraft 2000.

Each of the processes of illustrative method 1300 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 20, parts for aircraft 2000 produced by illustrative method 1300 may include airframe 2002 with a plurality of high-level systems 2004 and interior 2006. Examples of high-level systems 2004 include one or more of propulsion system 2008, electrical system 2010, hydraulic system 2012, and environmental system 2014. Any number of other systems may be included. Although an aerospace example is shown, the principles disclosed herein may be applied to other industries, such as the automotive industry. Accordingly, in addition to aircraft 2000, the principles disclosed herein may apply to other vehicles, e.g., land vehicles, marine vehicles, space vehicles, etc.

Apparatus(es) and method(s) shown or described herein may be employed during any one or more of the stages of the manufacturing and method 1300. For example, components or subassemblies corresponding to component and subassembly manufacturing may be fabricated or manufactured in a manner similar to components or subassemblies produced while aircraft 2000 is in service. Also, one or more examples of the apparatus(es), method(s), or combination thereof may be utilized during production stages, for example, by substantially expediting assembly of or reducing the cost of aircraft 2000. Similarly, one or more examples of the apparatus or method realizations, or a combination thereof, may be utilized, for example and without limitation, while aircraft 2000 is in service and/or during maintenance and service.

Examples of the present disclosure can be described according to one or more of the following clauses.

Clause 1: A removable hot box that is removable from a press, the removable hot box comprising:

a lower hot box portion, comprising: a lower housing comprising a plurality of lower clamping structures to clamp the lower housing to the press and one or more locating structures to provide repeatable placing in the press; and a lower heating platen, received within the lower housing and configured to support a lower die, wherein the lower housing or the lower heating platen comprises one or more lower electrical connectors to provide a lower electrical connection to a heating system and one or more lower cooling connectors to provide a lower cooling connection to a cooling system; and an upper hot box portion, positionable above the lower hot box portion and comprising: an upper housing comprising a plurality of upper clamping structures to clamp the upper housing to the press; an upper heating platen, received within the upper housing and configured to support an upper die, wherein the upper housing or the upper heating platen comprises one or more upper electrical connectors to provide an upper electrical connection to the heating system and one or more upper cooling connectors to provide an upper cooling connection to the cooling system.

Clause 2. The removable hot box of clause 1, further comprising an upper internal frame and a lower internal frame to provide support to the hot box when not in the press, wherein the upper interface frame is connected to the upper housing and the lower internal frame is connected to the lower housing.

Clause 3. The removable hot box of clause 1 or clause 2, further comprising one or more frame pins that connect the upper internal frame and the lower internal frame to yield a connected internal frame assembly.

Clause 4. The removable hot box of any of the clauses 1-3, wherein the lower internal frame and the upper internal frame provides for storing lower hot box portion and the upper hot box portion outside of the press.

Clause 5. The removable hot box of any of the clauses 1-4, wherein the lower internal frame provides for raising the lower hot box portion from a die cart or shuttle.

Clause 6. The removable hot box of any of the clauses 1-5, wherein the plurality of lower clamping structures and the plurality of upper clamping structures provide for hydraulic clamping to the lower hot box portion and the upper hot box portion to the press.

Clause 7. The removable hot box of clauses of any of the clauses 1-6, wherein the lower hot box portion further comprises a lower insulation layer that is positioned between the lower housing and the lower heating platen and the upper hot box portion further comprises an upper insulation layer that is positioned between the upper housing and the upper heating platen.

Clause 8. The removable hot box of any of the clauses 1-7, wherein the lower housing comprises a lower base plate and lower side walls, positioned above the lower base plate; the lower heating platen defines a lower slot, configured to receive a lower coupler for operatively retaining the lower die to the lower heating platen; and the lower side walls define a lower access passage, configured to provide access to the lower slot for operative insertion and removal of the lower coupler.

Clause 9. The removable hot box of any of the clauses 1-8, wherein the lower base plate, the lower insulation layer, and the lower heating platen collectively define at least one lower lift-pin passage, configured to receive at least one lower-die lift pin for operative engagement with the lower die and separation of the lower die from the lower hot box portion.

Clause 10. The removable hot box of any of the clauses 1-9, wherein: the lower base plate, the lower insulation layer, and the lower heating platen collectively define lower bolt passages; and the lower hot box portion further comprises: lower bolts, extending through the lower bolt passages; and spring-loaded lower nut assemblies, operatively coupled to the lower bolts and configured to permit the lower hot box portion to expand and contract without damage to the lower hot box portion.

Clause 11. The removable hot box of any of the clauses 1-10, wherein the upper hot box portion comprises an upper base plate, wherein the upper base plate, the upper insulation layer, and the upper heating platen collectively define upper bolt passages; and the upper hot box portion further comprises: upper bolts, extending through the upper bolt passages; and spring-loaded lower nut assemblies, operatively coupled to the upper bolts and configured to permit the upper hot box portion to expand and contract without damage to the upper hot box portion.

Clause 12. The removable hot box of any of the clauses 1-11, wherein the one or more lower cooling connectors and the one or more upper cooling connectors provide a no-spill quick connection and disconnection to the cooling system.

Clause 13. The removable hot box of any of the clauses 1-12, further comprising a seal position between the lower hot box portion and the upper hot box portion to provide a secure connection between the lower hot box portion and the upper hot box portion.

Clause 14. A method for operating a press with an interchangeable first hot box and an interchangeable second hot box, the method comprising:

preparing a first hot box for operation by heating the first hot box to a first operating temperature by an off-line heating system;

disconnecting the first hot box from the off-line heating system;

disconnecting the second hot box from the press;

replacing the second hot box with the first hot box in the press;

connecting the first hot box to the press; and operating the press with the first hot box.

Clause 15. The method of clause 14, wherein the connecting further comprises connecting one or more electrical connectors of the first hot box to the press.

Clause 16. The method of clause 14 or clause 15, wherein the connecting further comprises connecting one or more cooling system connectors of the first hot box to the press.

Clause 17. The method of any of the clauses 14-16, wherein the replacing further comprises moving the second hot box from the press to an off-line cooling system using a shuttle.

Clause 18. The method of any of the clauses 14-17, further comprises moving the first hot box from the off-line heating system to the press using a shuttle.

Clause 19. The method of any of the clauses 14-18, wherein the first operating temperature comprises a temperature range from about 800° F. to about 2000° F. for forming a part made from aluminum, titanium, stainless steel, or oxidation-corrosion-resistant materials such as austenitic nickel-chromium-based superalloys.

Clause 20. The method of any of the clauses 14-19, further comprising connecting one or more lower cooling connectors and one or more upper cooling connectors to a cooling system to provide a no-spill quick connection and disconnection to the cooling system.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A removable hot box that is removable from a press, the removable hot box comprising:

a lower hot box portion, comprising: a lower housing comprising a plurality of lower clamping structures configured to clamp the lower housing to the press and one or more locating structures configured to provide repeatable placing in the press; and a lower heating platen, received within the lower housing and configured to support a lower die, wherein the lower housing or the lower heating platen comprises one or more lower electrical connectors configured to provide a lower electrical connection to a heating system and one or more lower cooling connectors configured to provide a lower cooling connection to a cooling system;

an upper hot box portion, positionable above the lower hot box portion and comprising: an upper housing comprising a plurality of upper clamping structures configured to clamp the upper housing to the press; an upper heating platen, received within the upper housing and configured to support an upper die, wherein the upper housing or the upper heating platen comprises one or more upper electrical connectors configured to provide an upper electrical connection to the heating system and one or more upper cooling connectors configured to provide an upper cooling connection to the cooling system; and a flexible heat seal positioned between the lower hot box portion and the upper hot box portion configured to provide a secure and joined connection between the lower hot box portion and the upper hot box portion.

2. The removable hot box of claim 1, further comprising an upper internal frame and a lower internal frame configured to provide support to the hot box when not in the press, wherein the upper internal frame is connected to the upper housing and the lower internal frame is connected to the lower housing.

3. The removable hot box of claim 2, wherein the lower internal frame and the upper internal frame configured to provide for storing the lower hot box portion and the upper hot box portion outside of the press.

4. The removable hot box of claim 2, wherein the lower internal frame is configured to provide for raising the lower hot box portion from a die cart or shuttle.

5. The removable hot box of claim 1, wherein the plurality of lower clamping structures and the plurality of upper clamping structures are configured to provide for hydraulic clamping to the lower hot box portion and the upper hot box portion to the press.

6. The removable hot box of claim 1, wherein the lower hot box portion further comprises a lower insulation layer that is positioned between the lower housing and the lower heating platen and the upper hot box portion further comprises an upper insulation layer that is positioned between the upper housing and the upper heating platen.

7. The removable hot box of claim 6, wherein the lower housing comprises a lower base plate and lower side walls, positioned above the lower base plate; the lower heating platen defines a lower slot, configured to receive a lower coupler for operatively retaining the lower die to the lower heating platen; and the lower side walls define a lower access passage, configured to provide access to the lower slot for operative insertion and removal of the lower coupler.

8. The removable hot box of claim 7, wherein the lower base plate, the lower insulation layer, and the lower heating platen collectively define at least one lower lift-pin passage, configured to receive at least one lower-die lift pin for operative engagement with the lower die and separation of the lower die from the lower hot box portion.

9. The removable hot box of claim 8, wherein: the lower base plate, the lower insulation layer, and the lower heating platen collectively define lower bolt passages; and the lower hot box portion further comprises: lower bolts, extending through the lower bolt passages; and spring-loaded lower nut assemblies, operatively coupled to the lower bolts and configured to permit the lower hot box portion to expand and contract without damage to the lower hot box portion.

10. The removable hot box of claim 9, wherein the upper hot box portion comprises an upper base plate, wherein the upper base plate, the upper insulation layer, and the upper heating platen collectively define upper bolt passages; and the upper hot box portion further comprises: upper bolts, extending through the upper bolt passages; and spring-loaded lower nut assemblies, operatively coupled to the upper bolts and configured to permit the upper hot box portion to expand and contract without damage to the upper hot box portion.

11. The removable hot box of claim 1, wherein the one or more lower cooling connectors and the one or more upper cooling connectors are configured to provide a no-spill quick connection and disconnection to the cooling system.

12. The removable hot box of claim 1, wherein the lower hot box portion and the upper hot box portion are configured to be heated for operation by heating the lower hot box portion and the upper hot box portion to an operating temperature by an off-line heating system.

13. The removable hot box of claim 1, wherein the lower hot box portion and the upper hot box portion are configured to be moved between the press and an off-line cooling system using a shuttle.

14. The removable hot box of claim 1, wherein the lower hot box portion and the upper hot box portion are configured to be moved between the press and an off-line heating system using a shuttle.

15. The removable hot box of claim 12, wherein the operating temperature comprises a temperature range from about 800° F. to about 2000° F. for forming a part made from aluminum, titanium, stainless steel, or oxidation-corrosion-resistant materials including austenitic nickel-chromium-based superalloys.

16. The removable hot box of claim 1, further comprising the lower die configured to be supported by the lower hot box portion and the upper die configured to be supported by the upper hot box portion.

17. The removable hot box of claim 1, wherein the lower hot box portion is configured to receive a forming pressure by the press for forming a part that is higher than a closing pressure applied to the upper hot box portion by the press.

18. The removable hot box of claim 1, wherein the one or more lower electrical connectors are arranged on a rear side of the lower hot box portion and the one or more upper electrical connectors are arranged on a rear side of the upper hot box portion.

19. The removable hot box of claim 18, wherein the one or more lower cooling connectors are arranged on an adjacent side relative to the rear side of the lower hot box portion and the one or more upper cooling connectors are arranged on an adjacent side relative to the rear side of the upper hot box portion.

20. The removable hot box of claim 1, wherein the lower hot box portion and the upper hot box portion are receivable and removable from a lower press assembly and an upper press assembly of the press.

* * * * *